United States Patent
Sumi et al.

[11] Patent Number: 5,881,288
[45] Date of Patent: Mar. 9, 1999

[54] DEBUGGING INFORMATION GENERATION SYSTEM

[75] Inventors: Fumio Sumi, Katano; Shuichi Takayama, Takarazuka; Junko Sayama, Kusatsu; Yoshiyuki Iwamura; Shoji Nagata, both of Hirakata; Motohide Nishibata, Kadoma, all of Japan

[73] Assignee: Matsushita Electric Industrial Co., Ltd., Osaka, Japan

[21] Appl. No.: 828,430

[22] Filed: Mar. 28, 1997

[30] Foreign Application Priority Data

Sep. 29, 1995 [JP] Japan .................................. 7-252710
Jun. 28, 1996 [JP] Japan .................................. 8-169195

[51] Int. Cl.$^6$ .................................................. G06F 9/445
[52] U.S. Cl. ................................................. 395/704
[58] Field of Search ........................... 395/704, 705–707

[56] References Cited

U.S. PATENT DOCUMENTS

| | | | |
|---|---|---|---|
| 4,667,290 | 5/1987 | Goss et al. ............................ | 395/707 |
| 5,230,050 | 7/1993 | Iitsuka et al. ......................... | 395/707 |
| 5,560,009 | 9/1996 | Lenkov et al. ........................ | 395/704 |
| 5,805,892 | 9/1998 | Nakajima ............................. | 395/704 |

FOREIGN PATENT DOCUMENTS

| | | |
|---|---|---|
| 413287 | 9/1994 | Japan . |
| 9325963 | 6/1993 | WIPO . |
| 9325964 | 6/1993 | WIPO . |

OTHER PUBLICATIONS

"A New Approach to Debugging Optimized Code", by G. Brooks et al., 8398 ACM Sigplan Notices, 27 (1992) Jul., No. 7.

"Optimizing Compilers Address Debugging and User Control Constraints", by H. Falk, Computer Design, vol. 27, No. 13, Jul. 1988.

*Primary Examiner*—James P. Trammell
*Assistant Examiner*—Wei Y. Zhen
*Attorney, Agent, or Firm*—Price Gess & Ubell

[57] ABSTRACT

A program development system in which the debugging apparatus is informed of all of the optimization processes which have been performed. A primitive storage unit stores record information for the optimization processes. The input unit receives an input of a variable and a value, or an input of a line where execution is to be halted. The primitive combining unit obtains record information showing the optimization processes. The code execution unit executes the execution code. The variable operation unit obtains the value of a variable based on relations between variables and resources. The output unit displays the obtained value of the variable. The line display unit displays the program or the generated execution code. The line information display unit displays, in line units, information relating to the optimization performed for each line, The operation-possible variable display unit displays, for each line, variables which can be set and referred to in the line. The optimization process display unit shows how the optimization affects each variable.

24 Claims, 27 Drawing Sheets

FIG. 2A  PRIOR ART
PROGRAM STORAGE UNIT

```
Line:1   void test(void){
Line:2     int a,b,x,z;
Line:3     b=100;
Line:4     init();
Line:5     while(1){
Line:6       x=getData1();
Line:7       a=12*b;
Line:8       g1(a);
Line:9       z=x;
Line:10      g2(z);
Line:11      g3(x);
Line:12    }
Line:13  }
```

FIG. 2B  PRIOR ART
GENERATED CODE STORAGE UNIT

```
test:

0x100 save
0x104 mov 100,(SP+3)
0x108 call_init

Loop:

0x10C call_getData1
0x110 mov D0,D1

0x114 mov 12,D2
0x118 mul (SP+3),D2

0x11C mov D2,D0
0x120 call_g1

0x124 mov D1,D3

0x128 mov D3,D0
0x12C call_g2

0x130 mov D1,D0
0x134 call_g3

0x138 jmp Loop
0x13C restore
0x140 return
```

FIG. 2C  PRIOR ART

LINE-ADDRESS STORAGE UNIT

| ADDRESS | LINE |
|---------|---------|
| 0x100 | Line:1 |
| 0x104 | Line:3 |
| 0x108 | Line:4 |
| 0x10C | Line:6 |
| 0x114 | Line:7 |
| 0x11C | Line:8 |
| 0x124 | Line:9 |
| 0x128 | Line:10 |
| 0x130 | Line:11 |
| 0x138 | Line:12 |
| 0x13C | Line:13 |

FUNCTION INFORMATION STORAGE UNIT

| FUNCTION | |
|---|---|
| test | STARTING ADDRESS : 0x100<br>ARGUMENTS  void<br>RETURN VALUE  void |
| | LOCAL VARIABLES  int a:<br>                 int b:SP+3<br>                 int x<br>                 int z |

FIG. 2D  PRIOR ART

| VARIABLE | RESOURCE | RANGE |
|----------|----------|-------|
| a | D2 | 0x11c — 0x134 |
| x | D1 | 0x114 — 0x134 |
| z | D3 | 0x128 — 0x134 |

FIG. 3A  PRIOR ART

INPUT UNIT | DISPLAY VALUE OF VARIABLE z AT LINE 10

FIG. 3B  PRIOR ART

LINE DISPLAY UNIT

| | |
|---|---|
| Line:1 | void test(void){ |
| Line:2 | int a,b,x,z; |
| Line:3 | b=100; |
| Line:4 | init(); |
| Line:7 | while(1){ |
| Line:5 | x=getData1(); |
| Line:6 | a=12*b; |
| Line:8 | g1(a); |
| Line:9 | z=x; |
| Line:10 | g2(z); |
| Line:11 | g3(x); |
| Line:12 | } |
| Line:13 | } |

EXECUTION HALTED POSITION → Line:10

FIG. 3C  PRIOR ART

OUTPUT UNIT | VALUE OF VARIABLE z IS 10

FIG. 5A

PROGRAM STORAGE UNIT

```
Line:1   void test(void){
Line:2      int a,b,x,z;
Line:3      b=100;   ←CONSTANT PROPAGATION
Line:4      init();
Line:5      while(1){
Line:6         x=getData1();
Line:7         a=12*b;   ←CONSTANT PROPAGATION
Line:8         g1(a);        LOOP INVARIANT STATEMENT
Line:9         z=x;   ←COPY PROPAGATION
Line:10        g2(z);   ←COPY PROPAGATION
Line:11        g3(x);
Line:12     }
Line:13  }
```

FIG. 5B

OPTIMIZED CODE

| Line:1 | void test(void){ |
|---|---|
| Line:2 | int a,b,x,z; |
| Line:3 | *delete*   ←DELETE REDUNDANT STATEMENT |
| Line:4 | init(); |
|  | a=12*100;   ←(NEWLY INSERTED) |
| Line:5 | while(1){ |
| Line:6 | x=getData1(); |
| Line:7 | *move* (SHOWS MOVED LINE) |
| Line:8 | g1(a); |
| Line:9 | *delete*   ←DELETE REDUNDANT STATEMENT |
| Line:10 | g2(x); |
| Line:11 | g3(x); |
| Line:12 | } |
| Line:13 | } |

FIG. 5C

CODE WHICH IS ALLOCATED REGISTERS

| Line:1 | void test(void){ |
| Line:2 | int a,b,x,z; |
| Line:3 | *delete* |
| Line:4 | init(); |
| | D2=12*100; |
| Line:5 | while(1){ |
| Line:6 | D3=getData1(); |
| Line:7 | *move* |
| Line:8 | g1(D2); |
| Line:9 | *delete* |
| Line:10 | g2(D3); |
| Line:11 | g3(D3); |
| Line:12 | } |
| Line:13 | } |

FIG. 5D

GENERATED PRIMITIVE INFORMATION

| Line:1 | |
| Line:2 | |
| Line:3 | DELETED LINE |
| Line:4 | |
| Line:5 | RESOURCE a:D2 |
| Line:6 | RESOURCE a:D2 |
| Line:7 | MOVED LINE To:Line4   REPLACEMENT b–>100 |
| Line:8 | RESOURCE a:D2 RESOURCE x:D3 |
| Line:9 | DELETED LINE |
| Line:10 | REPLACEMENT z–>x   RESOURCE a:D2 RESOURCE x:D3 |
| Line:11 | RESOURCE a:D2 RESOURCE x:D3 |
| Line:12 | |
| Line:13 | |

FIG. 5E

| | |
|---|---|
| Line:1 | |
| Line:2 | |
| Line:3 | DELETED LINE |
| Line:4 | |
| Line:5 | |
| Line:6 | |
| Line:7 | MOVED LINE To:Line4 |
| Line:8 | RESOURCE a:D2 |
| Line:9 | DELETED LINE |
| Line:10 | REPLACEMENT z->x      RESOURCE x:D3 |
| Line:11 | RESOURCE x:D3 |
| Line:12 | |
| Line:13 | |

PRIMITIVE STORAGE UNIT

FIG. 6A  LIST OF PRIMITIVES

| | TYPE | EXPRESSION FORMAT | MEANING |
|---|---|---|---|
| PRIMITIVES FOR VARIABLES | DELETED VARIABLE | DELETE X1 | VARIABLE X1 DELETED |
| | MOVED VARIABLE | MOVE X2 To:Line1 | VARIABLE X2 MOVED TO Line1 |
| | REPLACED VARIABLE | REPLACE X3 —>y1<br>REPLACE X4 —>5 | VARIABLE X3 REPLACED WITH VARIABLE y1<br>VARIABLE X4 REPLACED WITH CONSTANT 5 |
| | RESOURCE FOR VARIABLE | RESOURCE X5:D1 | VARIABLE X5 PRESENT IN REGISTER D1 |
| PRIMITIVES FOR SUBEXPRESSIONS | SUBEXPRESSION REPLACED | REPLACE X6+3→t1 | SUBEXPRESSION X6+3 REPLACED WITH VARIABLE t1 |
| PRIMITIVES FOR LINES | DELETED LINE | DELETE LINE | LINE DELETED |
| | MOVED LINE | MOVE LINE To:Line1 | LINE MOVED TO Line1 |
| | GENERATED STATEMENT | GENERATE STATEMENT Line5 | STATEMENT GENERATED AT Line5 |

FIG. 6B

CORRESPONDENCE BETWEEN GENERATED PRIMITIVES AND OPTIMIZATION

| PRIMITIVE<br><br>OPTIMIZATION PROCESS | PRIMITIVES FOR VARIABLES | | | | PRIMITIVES FOR SUBEXPRESSIONS | PRIMITIVES FOR LINES | | | 
|---|---|---|---|---|---|---|---|---|
| | DELETED VARIABLE | MOVED VARIABLE | REPLACED VARIABLE | RESOURCE FOR VARIABLE | SUBEXPRESSION REPLACED | DELETED LINE | MOVED LINE | GENERATED STATEMENT |
| COMMON SUBEXPRESSION OPTIMIZATION | | | | | GENERATION | | | GENERATION |
| CONSTANT PROPAGATION OPTIMIZATION | | | GENERATION | | | GENERATION | | |
| COPY PROPAGATION OPTIMIZATION | | | GENERATION | | | GENERATION | | |
| LOOP INVARIANT STATEMENT OPTIMIZATION | | | | | | | GENERATION | |
| REDUNDANT CODE OPTIMIZATION | GENERATION | | | | | GENERATION | | |
| REGISTER ALLOCATION | | | | GENERATION | | | | |

HARDWARE MODEL

FIG. 8A
GENERATED CODE STORAGE UNIT

```
test:
0x100  save
0x104  call_init

0x108  mov 12,D2
0x10C  mul 100,D2

Loop:
0x110  call_getData1
0x114  mov D0,D3

0x118  mov D2,D0
0x11C  call_g1

0x120  mov D3,D0
0x124  call_g2

0x128  mov D3,D0
0x12C  call_g3

0x130  jmp Loop

0x134  restore
0x138  return
```

FIG. 8B
DEBUGGING INFORMATION STORAGE UNIT

LINE-ADDRESS INFORMATION STORAGE UNIT

| ADDRESS | LINE |
|---|---|
| 0x100 | Line:1 |
| 0x104 | Line:4 |
| 0x108 | Line:7 |
| 0x110 | Line:6 |
| 0x118 | Line:8 |
| 0x120 | Line:10 |
| 0x128 | Line:11 |
| 0x130 | Line:12 |
| 0x134 | Line:13 |

FUNCTION INFORMATION STORAGE UNIT

| FUNCTION | STARTING ADDRESS:0x100 |
|---|---|
| test | ARGUMENTS void |
|  | RETURN VALUE void |
|  | LOCAL VARIABLES  int a |
|  | int b |
|  | int x |
|  | int z |

FIG. 9B

| LINE INFORMATION DISPLAY WINDOW | | LINE DISPLAY WINDOW | OPERATION-POSSIBLE VARIABLE DISPLAY WINDOW | | | |
|---|---|---|---|---|---|---|
| | | | a | b | x | z |
| Line:1 | | void test(void){ | | | | |
| Line:2 | | int a,b,x,z; | | | | |
| Line:3 | DELETED LINE | b=100; | | | | |
| Line:4 | | init(); | | | | |
| Line:7 | MOVED LINE | x=getData1(); | | | | |
| Line:5 | | while(1) { | | | | |
| Line:6 | | a=12*b; | | | | |
| Line:8 | | g1(a); | ○ | | | |
| Line:9 | DELETED LINE | z=x; | | | | |
| Line:10 | | g2(z); | | | ○ | ○ |
| Line:11 | | g3(x); | | | ○ | |
| Line:12 | | | | | | |
| Line:13 | | } | | | | |

HALT POSITION → Line:10

FIG. 16

|  | PROGRAM |
|---|---|
| Line1 | int y ,z |
| Line2 | main() |
| Line3 | { |
| Line4 |    int x; |
| Line5 |    x=t1 |
| Line6 |    if(x) { |
| Line7 |       y=x+3; |
| Line8 |    } else { |
| Line9 |       z=x+3; |
| Line10 |    } |
| Line11 |    g(); |
|  | } |

FIG. 17A

| | PROGRAM |
|---|---|
| Line1 | int y ,z |
| Line2 | main() |
| Line3 | { |
| Line4 | int x; |
| Line5 | |
| Line6 | in(t1) { |
| Line7 | y=t2; |
| Line8 | } else { |
| Line9 | z=t2; |
| Line10 | } |
| Line11 | g(); |
| | } |

FIG. 17B

PRIMITIVE STORAGE UNIT

| | | |
|---|---|---|
| Line1 | | |
| Line2 | | |
| Line3 | | |
| Line4 | | |
| Line5 | DELETED | |
| Line6 | SELECTx → t1 | RESOURCEt1:D0 |
| Line7 | REPLACEMENTx+3 → t2 | RESOURCEt2:D1 |
| Line8 | | |
| Line9 | REPLACEMENTx+3 → t2 | RESOURCEt2:D1 |
| Line10 | | |
| Line11 | | |
| Line12 | | |
| Line13 | | |

FIG. 17C

LINE-ADDRESS STORAGE UNIT

| ADDRESS | LINE |
|---------|---------|
| 0x_200  | Line.5  |
| 0x_208  | Line.6  |
| 0x_210  | Line.7  |
| 0x_218  | Line.9  |
| 0x_21C  | Line.11 |

FIG. 17D

GENERATED CODE STORAGE UNIT

| ADDRESS | GENERATED CODE |
|---------|----------------|
| 0x_200  | jsr f |
| 0x_204  | add r0, 3, r1 |
| 0x_208  | cmp r0, 0 |
| 0x_20C  | jeq L1 |
| 0x_210  | mov r1, (mem1) |
| 0x_214  | goto L2 |
|         | L1 |
| 0x_218  | mov r1 (mem2) |
|         | L2 |
| 0x_21C  | jsr g |

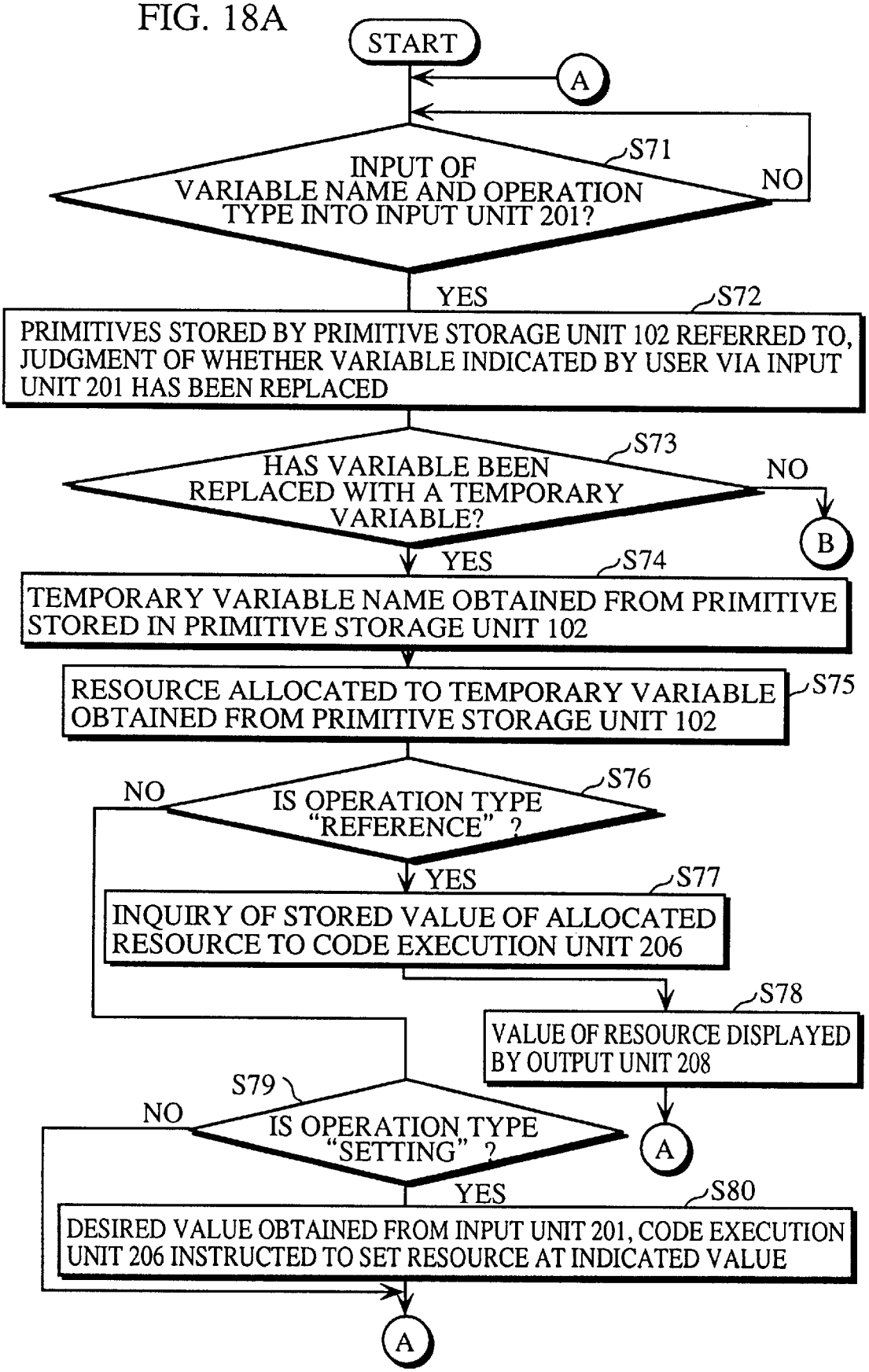

DEBUGGING INFORMATION GENERATION SYSTEM

BACKGROUND OF THE INVENTION (1) Field of the Invention

The present invention relates to a program development system which is made up of a debugging apparatus which, during software development, can check that execution code generated by a program conversion apparatus operates as intended and which can quickly discover any errors present in such code, and a debugging information generation apparatus for generating debugging information for the debugging apparatus.

(2) Description of the Related Art

In recent years, model changes for information processing equipment, such as word processors, home computers, and electronic notebooks, and for domestic electrical appliances, such as videos, televisions, and refrigerators, have become remarkably frequent. Consequently, the development period of such information processing equipment and domestic electric appliances has also become extremely short to allow such rapid model changes. As a result, manufacturers are constantly under intense pressure to complete the development of new products in such a short time. On the other handy the installation of microcomputers into such information processing equipment and domestic appliances is now taken for granted, so that the rapid development of a control program for such embedded microcomputers has become a vital task for the technicians of each manufacturer.

In this present situation, an increasing amount of attention is being given to the provision of a "high-level language-oriented development environment" for producing control software. This refers to a development environment wherein all processes from the coding of the program to the testing on the actual appliance can be performed using a high-level language. Here, the key to the provision of such a development environment is the generation of debugging information to enable operation verification to be performed by a debugging apparatus using the high-level language.

Debugging information is a general name given to all information which expresses the correspondence between a program written as the original source code statements and the program in its execution code state. Representative examples of debugging information are line-address information that shows the correspondence between each line in the source code statements and the addresses in the execution code, and allocation information that shows the correspondence between the variables in the source code and the registers and memory addresses used by the execution code. With such allocation information, if correspondence is clearly established between each of the variables, which are freely defined by the programmer and used according to necessity, and each hardware resource, such as a register or memory address, the programmer will be able to control the correspondence between the program written by him/herself and the execution code.

The following is an explanation, with reference to FIG. 1, of the construction of a conventional debugging apparatus which uses the kind of debugging information described above.

The debugging apparatus shown in FIG. 1 is made up of a program storage unit 301, a generated code storage unit 302, an optimization information storage unit 303, a debugging information storage unit 304, an input unit 401, a code execution unit 402, a variable operation unit 403, an output unit 404, and a line display unit 405.

The program storage unit 301 stores a program which is written by technicians using a high-level language.

The generated code storage unit 302 stores the generated execution code.

The optimization information storage unit 303 stores the allocation information for the program stored in the program storage unit 301.

The debugging information storage unit 304 is made up of a line-address storage unit 3041, which shows the correspondence between the lines in the program and the addresses of the execution code, and a function information storage unit 3042, which expresses function information. This function information in the function information storage unit 3042 includes a starting address for a function, the names and forms of the arguments and variables of the function, and, when a variable is held in the stack, an offset value for the stack.

The input unit 401 receives indications of variables whose values are to be set by a user and variables whose stored values are to be referred to.

The code execution unit 402 executes the execution code which it receives from the generated code storage unit 302.

The variable operation unit 403 receives the allocation information for a variable indicated by the input unit 401 from the optimization information storage unit 303 and the debugging information storage unit and determines which resource has been allocated the indicated variable. Here, "resources" refers to the registers or stack addresses in the execution code which have been allocated to express the variables. Having determined the resource as described above, the variable operation unit 403 asks the code execution unit 402 the value of the resource. After receiving the value of the resource, the variable operation unit 403 has the variable and its value displayed by the output unit 404.

The line display unit 405 receives the program from the program storage unit 301 and displays the function which includes the halt line.

The following is an explanation of the operation of the debugging apparatus of the construction described above. The content of the program storage unit 301 is shown in FIG. 2A. The content of the generated code storage unit 302 is shown in FIG. 2B. The content of the debugging information storage unit 304 is shown in FIG. 2C. The content of the optimization information storage unit 303 is shown in FIG. 2D.

When the debugging apparatus is activated, the line display unit 405 displays the program in function units, and the input unit 401 displays the command line and waits for a user input. If in this wait state, the user inputs a command which signifies a reference of the value of variable z on the tenth line (see FIG. 3A), the variable operation unit 403 searches the line-address storage unit 3041 and finds the address which corresponds to Line 10. For the example content of the line-address storage unit 3041 shown in FIG. 2C, Line 10 corresponds to the address "0×128". Once it is established that Line 10 corresponds to address "0×128", the code execution unit 402 is ordered to set a breakpoint at address "0×128" and the line display unit 405 is ordered to display Line 10 with an arrow. By displaying such an arrow, the user is informed of an execution of the program as far as line 10 (see FIG. 3B). The code execution unit 402 then executes the execution code stored in the generated code storage unit 302 as far as the address "0×128" which is set as the break point. Once the execution code has been executed as far as address "0×128", the variable operation unit 403 searches the optimization information storage unit 303 and determines which resource has been allocated to the indicated variable z. For the example content of the optimization information storage unit 303 shown in FIG. 2D, the resource allocated to indicated variable z is the register D3. Accordingly, the variable operation unit 403 obtains this register D3 from the optimization information storage unit 303 and instructs the code execution unit 402 to read the value of register D3. On being thus instructed the code execution unit 402 reads the stored value "10" of the data register D3, and the variable operation unit 403 instructs the output unit 404 to output the read value "10" as the stored value of the variable z. On being thus instructed, the output unit 404 displays the variable name of variable z together with the stored value "10" (see FIG. 3C).

As described above, the user inputs a variable name, and the resource to which the inputted variable is allocated is determined using the variable-resource correspondence information. Following this, the code execution unit outputs the value or the resource so that the user can know the value of each variable when the program is executed in its execution code state on the intended machine.

The disadvantage of such debugging apparatuses which improve the efficiency of program development using correspondence between variables and resources lies in their inability to show the user the content of the optimization executed inside the program conversion unit, so that when the program is greatly rewritten by the internal processing of the program conversion unit, it will take the user a great deal of time to comprehend how his/her program has been rewritten.

For example, when a user wishes to change the value of a variable, if a subexpression containing the variable in question is rewritten into a temporary variable, such a change in value will not be possible unless the user can grasp the correspondence between the temporary variable and the original subexpression. Here, if the user attempts to change the value of a variable without properly understanding the correspondence between the temporary variable and the subexpression, there is the danger that the changing of the variable can lead to erroneous operation by the program.

A new debugging method has disclosed by Japanese Laid-Open Patent Application 6-274369. In this method, the program conversion apparatus is made to analyze the changes in source code statements before and after optimization, and to generate information which shows the progression of these changes. More specifically, when there is a variable in the source code statements which is rewritten into a different variable, the program conversion apparatus analyzes which resource has been allocated to the rewritten variable and generates information which shows "pre-replacement variable-resource" pairings.

As an example, when the subexpression "2+*n" in the source code statement "s=s+2*n" is replaced with the variable "n1" during optimization, analysis is performed to find the resource which has been allocated to the substituted variable n1. If the result is resource R6, information is generated which shows that the variable "n" in the present operation expression is expressed as "R6/2".

Problem which the Present Invention is Attempting to Solve

However, the "pre-replacement variable-resource" or "format of expression including the variable and resource" information of the method disclosed by Japanese Laid-open Patent Application 6-274369 have still not been able to fully express the details of the complex optimization processes which rewrite the source program, such as "replacement of variables", "deletion of lines", and "movement of lines".

The internal processing of the optimization is made up of combinations of fundamental algorithms, such as the deletion of source code statements, the movement of source code statements, and the substitution, movement, or deletion of variables. Here, the program conversion apparatus generates temporary variables according to its needs which it then uses to perform optimization. For conventional debugging methods, on the other hand, when the variables in source code statements are replaced with other variables during optimization, and other source code statements are deleted or moved after such replacement, the "pre-replacement variable-resource" information and "format of expression including the variable and resource" information are generated based on the program in its final state after all these optimization operations have been performed.

When the replacement of variables and the combining of lines are relatively simple, it is probably worth the technician's while to view the generated information, but when the replacement and combining of lines are more complex, it becomes difficult to grasp the details of the generated information, which increases the workload for technicians.

Here, it is possible to conceive of a standardization of the method for expressing debugging information to express the details of the processes performed by established well-known optimization methods, such as "copy propagation", "constant propagation", or by any other new optimization method. However, such new optimization methods are being constantly developed and introduced, so that even if a method for expressing debugging information is standardized for established optimization methods or optimization methods which are currently subject to a lot of attention, there is the danger that such a standard would be out-of-date with respect to any new methods being developed.

SUMMARY OF THE INVENTION

The first object of the present invention is to provide a program development system which includes a debugging information generation apparatus which can accurately express even complex optimization processes which are combinations of fundamental algorithms such as line deletion, variable replacement, variable movement, and variable deletion.

The second object of the present invention is to provide a program development system which includes a debugging information generation apparatus which allows the expansion of the representation of optimization processes, so that even if a program conversion apparatus should perform a new optimization method made up of a combination of the fundamental algorithms which are namely line deletion, variable replacement, variable movement, and variable deletion, the debugging information generation apparatus will still be able to express the new optimization method as such a combination.

The first and second objects of the present invention can be achieved by a program development system made up of a debugging information generation apparatus, which monitors a compiling of a source file made up of a plurality of source code statements and which generates information for debugging, and a debugging apparatus for performing operation verification of a machine language program obtained from the compiling, the debugging information generation apparatus including: a first judging means for judging, for each line of the source file, whether any predetermined editing functions have been applied to any set of code in the source file during optimization of internal expressions which are generated from the source file during the compiling; and a generating means for generating, when any of the predetermined editing functions is judged to have been applied to a set of code, transformation information which expresses a transformation due to the applied editing function as combination of a line number of a line which includes a source code statement corresponding to the set of code, the applied editing function, and the set of code before and after the editing function has been applied, and the debugging apparatus including: a command receiving means for receiving a debugging command which is a command to verify operation of the machine language program created by the compiling; an analyzing means for interpreting a content of the debugging command, and, when the debugging command includes an indication for a set of code before an application of an editing function, for analyzing details of a transformation of the set of code due to the application of the editing function, based all of the transformation information which includes the set of code; a first display means for displaying the details of the transformation analyzed by the analyzing means; and an operation verification moans for referring to the details of the transformation analyzed by the analyzing means and detecting sets of execution code, out of all sets of execution code in the machine language program, which relate to the debugging command and performing operation verification for the detected sets of execution code, For the above construction, when a complex optimization which is a combination of line deletion, variable replacement, variable movement, and variable deletion algorithms is performed in the program development system, the judging means judges whether each of the predetermined editing functions has been performed and the generating means then generates appropriate sets of transformation information, By having a first judging means monitor the optimization process in this way, the optimization processes performed on the internal expressions can be expressed accurately. As a result, optimization methods made up of combinations of the fundamental algorithms, line deletion, variable replacement, variable movement, and variable deletion, can be expressed accurately.

When the compiled machine language program is debugged, the debugging apparatus interprets the content of the debugging command and, when pre-editing code is indicated by the debugging command, the details of the transformation during editing of the pre-editing code is found from all of the transformation information which includes the code in question. After such details have been analyzed, the first display means displays the analyzed details, so that even if the original source code statements have been greatly rewritten, the program developer will soon be able to understand how his/her program has been rewritten during optimization. By doing so, the program developer will not be baffled by the optimization of the program, and will be able to perform the operation verification of the machine language program while conscious of the source code statements written in the high-level programming language.

Here, the first judging means may include: a first judging unit for judging whether a first editing function, in which a variable in a source code statement is replaced with one of another variable and a constant, has been performed during optimization: a second judging unit for judging whether a second editing function, in which a subexpression in a source code statement is replaced with one of another variable and a constant, has been performed during optimization; a third judging unit for judging whether a third editing function, in which a source code statement is moved to another line, has been performed during optimization; and a fourth judging unit for judging whether a fourth editing function, in which a source code statement is deleted, has been performed during optimization, and the generating means may include: a first generating unit for generating, when it is judged that the first editing function has been performed, a set of type 1 transformation information which includes a line number of a line where the corresponding source code statement is present, a replaced variable name for the variable which is replaced, one of a substitute constant and a substitute variable after replacement, and identification information which shows replacement is performed; a second generating unit for generating, when it is judged that the second editing function has been performed, a set of type 2 transformation information which includes a line number of a line where the corresponding source code statement is present, a replaced subexpression which is replaced, one of a substitute constant and a substitute variable after replacement, and identification information which shows replacement is performed: a third generating unit for generating, when it is judged that the third editing function has been performed, a set of type 3 transformation information which includes an original line number which is a line number of a line where the source code statement was originally present, a destination line number which is a line number of a line to which the source code statement has been moved, and identification information showing that movement is performed; and a fourth generating unit for generating, when it is judged that the fourth editing function has been performed, a set of type 4 transformation information which includes a line number of a line where the source code statement was originally present, and identification information showing that deletion is performed.

With the above construction, the first to fourth editing functions, namely, the replacement of a variable, the replacement of an expression, the movement of a line, and the deletion of a line, are functions which are performed both in well-known optimization processes, such as "copy propagation" or "constant propagation", and in the optimization processes which are presently subject to much attention, so that such optimization processes can be expressed as combinations of the editing functions, making the representation of new optimization processes possible. This establishes a universal form or expression for optimization processes. By doing so, it is easy to register new optimization processes and so amend the information recorded in the debugging apparatus.

Also, the debugging apparatus may further include; a transformation information storage means for storing sets of type 1 to type 4 transformation information generated by the first to fourth generating units; and an allocation information storage means for storing sets of allocation information, each made up of pairings of a line number of a line where a source code statement is present and a variable name-resource name relation, which express which hardware resource has been allocated to which variable in which source code statement, wherein the analyzing means may include: a first interpreting unit for interpreting an indication of a variable name included in the debugging command whose stored value is to be read; a first detecting unit for detecting the variable interpreted by the first interpreting unit, when the variable is indicated as one of a replaced variable and a substitute variable by one of a set of type 1 transformation information and a set of type 2 transformation information stored by the transformation information storage means; a second detecting unit for detecting any set of allocation information stored in the allocation information storage unit which includes a substitute variable included in the set of transformation information detected by the first detecting unit; a combining unit for combining a new set of allocation information made up of a replaced variable and a substitute variable in the set of transformation information detected by the first detecting unit and a resource name in the set of allocation information detected by the second detecting unit; and a reading unit for reading, when included in a read instruction, a value of a hardware resource which is indicated by the resource name included in the new set of allocation information, and wherein the first display means includes a first display unit for displaying, when a read operation of a hardware resource has been performed, a message showing that the replaced variable has been replaced with the substitute variable, and that both the replaced variable and the substitute variable have the value read from the hardware resource.

With the above construction, when the user indicates a replaced variable, instead of merely trying to read the value of the variable, the system displays a message showing the replacement of the replaced variable with the substitute variable and a value read from a hardware resource for the combination of variables, so that the user can be made aware of the relationship between variables. This allows the user to perform the debugging process more easily.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 2A shows an example of the stored content of the program storage unit 301;

FIG. 2B shows an example or the stored content of the generated code storage unit 302;

FIG. 2C shows an example of the stored content of the debugging information storage unit 304;

FIG. 2D shows an example of the stored content of the optimization information storage unit 303;

FIG. 3A shows an example of an input operation for the input unit 401;

FIG. 3B shows the content of the display by the line display unit 405;

FIG. 3C shows the content or the display by the output unit 404;

FIG. 5A shows an example of the stored content of the program storage unit 101;

FIG. 5B shows an example of the stored content of the generated code storage unit 103;

FIG. 5C shows an example of the stored content of the debugging information storage unit 104;

FIG. 5D shows an example of the stored content of the primitive storage unit 102;

FIG. 5E shows an example of the stored content of the primitive storage unit 102 after the deletion of primitives by the moved line information deletion unit 108 and the redundant variable information deletion unit 109;

FIG. 6A shows the correspondence between the primitive names, the expression formats, and the meaning contents of the primitives stored by the primitive storage unit 102;

FIG. 6B shows the correspondence between the optimization items and the primitives;

FIG. 8A shows an example of the execution code sequence stored by the generated code storage unit 103;

FIG. 8B shows an example of the execution code sequence stored by the debugging information storage unit 104;

FIG. 9B shows an example display on the display 502 composed of the displays by the line display unit 209, the line information display unit 210, and the operation-possible variable display unit 211;

FIG. 16 shows an example of the stored content of the program storage unit 101 in the second embodiment of the present invention;

FIG. 17A shows an example of the stored content of the program storage Unit 101 in the second embodiment;

FIG. 17B shows an example of the stored content of the primitive storage unit 102 in the second embodiment;

FIG. 17C shows an example of the stored content of the debugging information storage unit 104 in the second embodiment;

FIG. 17D shows an example of the stored content of the generated code storage unit 103 in the second embodiment;

FIG. 18A is a flowchart for the processing content of the variable operation unit 207 in the second embodiment;

DESCRIPTION OF THE PREFERRED EMBODIMENTS

Figure 1:
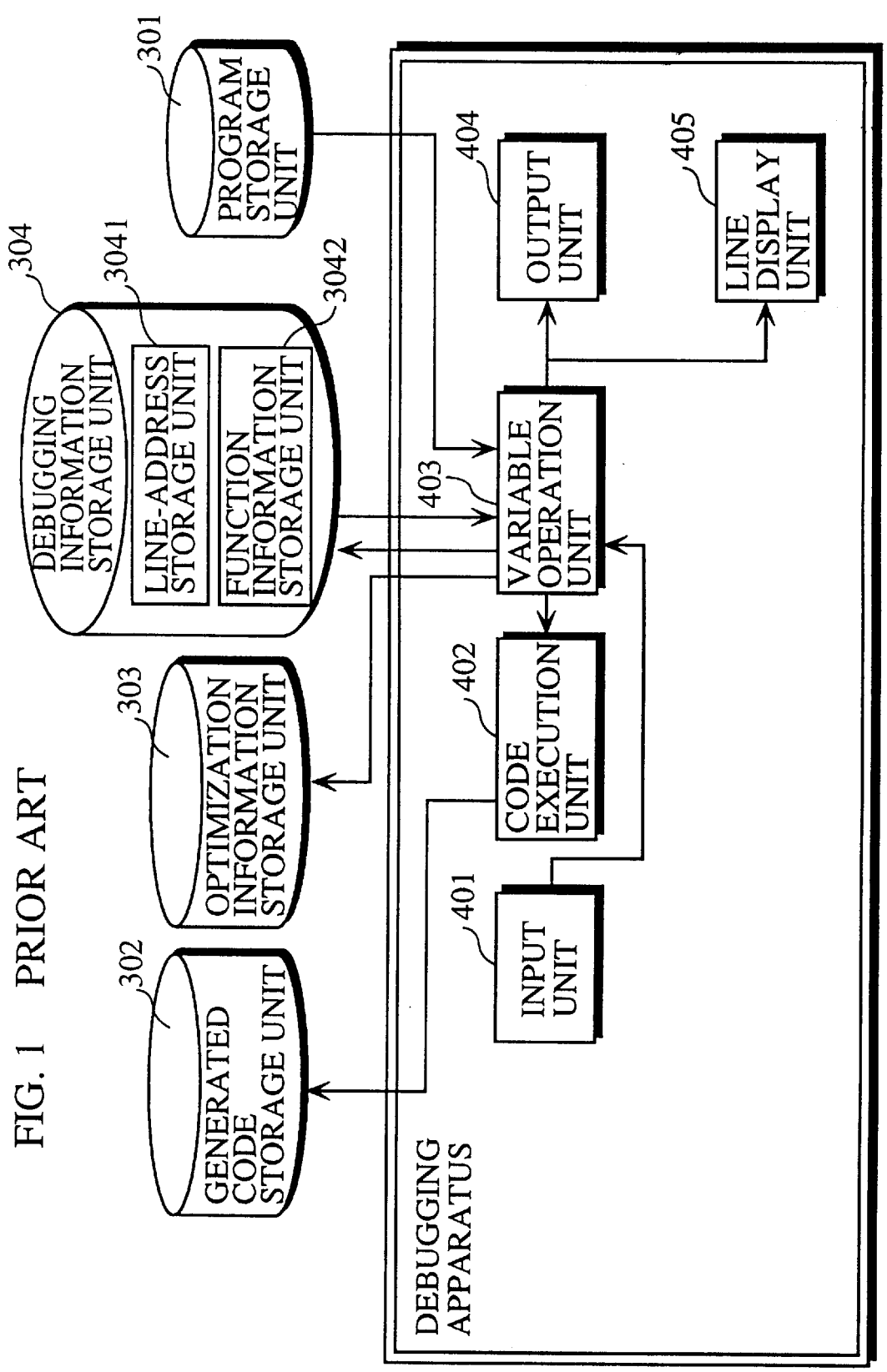
FIG. 1 shows the construction of a conventional debugging apparatus.
Figure 4:
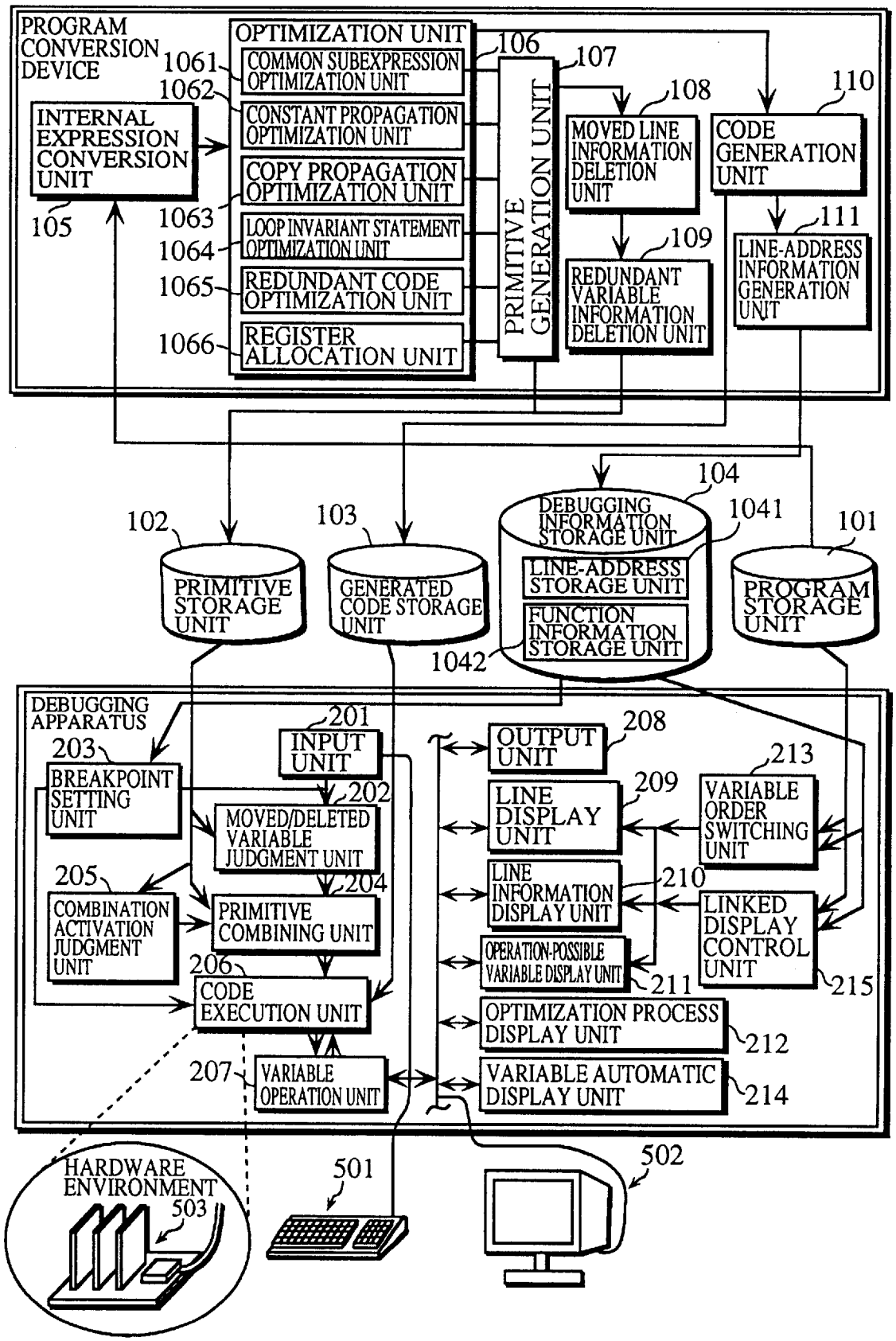
FIG. 4 shows the internal construction of the program conversion apparatus and the internal construction of the debugging apparatus, as well as the input/output interrelations between these constructions and the program storage unit 101, the primitive storage unit 102, the generated code storage unit 103, and the debugging information storage unit 104.

The following is an explanation of the embodiments of the present invention, with reference to FIGS. 4 through 19C. The entire construction of the program development system in the first embodiment is shown in FIG. 4. In this embodiment, the program development system is composed of a program conversion apparatus equipped with a debugging information generation apparatus, a debugging apparatus, a program storage unit 101, a primitive storage unit 102, a generated code storage unit 103, and a debugging information storage unit 104. Here, the information stored by the program storage unit 101, the primitive storage unit 102, the generated code storage unit 103, and the debugging information storage unit 104 is used by both the program conversion apparatus and the debugging apparatus.

The program storage unit 101 includes a storage region which is divided into line units which store the source program created by a technician in a high-level programming language.

FIG. 5A shows an example of a source program written in "C" language which is stored by the program storage unit 101. This example program is made up of a plurality of source code statements which have been numbered "Line 1", "Line 2", "Line 3". . . . Each line stores a statement in the source code which have been demarcated using semicolons ";". of these statements, statements (called substitution statements) featuring an equals sign "=" have a variable name on the left edge of the equals sign to show that the value to the right of the equals sign is substituted into this variable.

In the present example, there are three kinds of substitution statement. The first kind has a variable on its right side to be substituted into the left-side variable. The second kind has a constant on its right side to be substituted into the left-side variable. The third kind has an operation made up of operands and operators on its right side whose result is to be substituted into the left-side variable.

The following is an explanation of the meaning of the statements in the program shown in FIG. 5A which is stored by the program storage unit 101.

The source code statement "Void test (void)" in Line 1 indicates the start of the function "test". In this statement, the expression "void" shows that there is no return value of the argument of the function "test".

Line 2 is a declarative statement which declares that the temporary variables "a, b, x, z", which are exclusively used by the function "test", are integers "int".

Line 3 is a substitution statement which shows the substitution of the value 100 into variable b.

Line 4 is a function call statement for calling the function "init".

Line 5 indicates that while the condition "*" in "while (*)" is in the logical state "1", the range enclosed by the curved brackets "{" and "}", which is to say Lines 5 to 12, will be repeated. Since the condition specified in Line 5 is "1", the range between the curved brackets "{", "}" will be repeatedly ad infinitum.

Line 6 is a statement which represents a call of the function "getData1" and a substitution of the return value of this function into the variable x.

Line 7 represents a substitution of the result of the operation expression "12*b" into variable a.

Line 8 represents a call of function g1 with the variable a as an argument.

Line 9 represents the substitution of the value of variable x into the variable z.

Line 10 represents a call of function g2 with the variable z as an argument.

Line 11 represents a call of function g3 with the variable x as an argument.

Line 12 shows the end of the repeated region defined in Line 5.

Line 13 expresses the end of the function "test".

The primitive storage unit 102 has a storage area which is divided into lines in the same way as the program storage unit 101. The difference with the program storage unit 101, is that while the program storage unit 101 stores the source program which is created beforehand by the programmer, no such information is written into the primitive storage unit 102 in its initial state. The primitive storage unit 102 is used, however, to store information called primitives which are generated by the primitive generation unit 107. Primitives are described later in this text.

The generated code storage unit 103 is similarly divided into a plurality of small regions, with each of these small regions having a storage region which is assigned an address. These storage regions are used to store execution code when execution code has been generated by the code generation unit 110. Execution code is also described later in this text.

The debugging information storage unit 104 is made up of a line-address storage unit 1401 and a function information storage unit 1402. The line-address storage unit 1401 includes a storage region which is divided into correspondence tables. These correspondence tables have an address column and a line column which are respectively used to record the addresses given to small regions in the storage area or the generated code storage unit 103 and the line numbers assigned to each line in the program storage unit 101.

The function information storage unit 1042 stores the names of the functions provided by the source program stored in the program storage unit 101, their arguments and return values, and the names and formats of the arguments and return values of the functions. In readiness for when functions are converted into execution code, the starting address of each function is also recorded. Also, in readiness for when variables are stored in stack addresses, an offset value for the stack can be recorded.

The following is an explanation of the construction of the program conversion apparatus shown in FIG. 4. This program conversion apparatus is made up of an internal expression conversion unit 105, an optimization unit 106, a primitive generation unit 107, a moved line information deletion unit 106, a redundant variable information deletion unit 109, a code generation unit 110, and a line-address information generation unit 111. Of these, the primitive generation unit 107 and the line-address information generation unit 111 compose the debugging information generation apparatus.

The internal expression conversion unit 105 receives the program from the program storage unit 101 and converts character strings into internal expressions. Here, it is normal for internal expressions to be expressed using syntax analysis although in the present embodiment, a method which expresses the corrections made to the program is used for ease of understanding.

The optimization unit 106 rewrites the program converted into internal expressions by the internal expression conversion unit 105. In order to do so, the optimization unit 106 is made up of a common subexpression optimization unit 1061, a constant propagation optimization unit 1062, a copy propagation optimization unit 1063, a loop invariant statement optimization unit 1064, a redundant code optimization unit 1065, and a register allocation unit 1066.

The common subexpression optimization unit 1061 analyzes whether common operation expressions are used on the right edge of a plurality of substitution statements. This kind of analysis is performed because calculation instructions which include control of an arithmetic logic unit (ALU) provided in the central processing unit (CPU) are generated from operation expressions such as additions, subtractions, multiplications, and divisions. These calculation instructions create a load for the ALU which is much higher than other instructions, so that if a same operation expression is present in a plurality of substitution statements, the load on the CPU will be increased in proportion to this number of substitution statements. To avoid this phenomenon, the common subexpression optimization unit 1061 analyses whether a common operation expression is used on the right edge of a plurality of substitution statements.

The following is an explanation which refers to an example program which includes four substitution statements, "y=fnc(x*300)", "z=(x*300)+5", "a=b+13*(x*300)", and "a=540/(x*300)", which all include the operation expression "x*300". When these are analyzed by the common subexpression optimization unit 1061, the operation expression "x*300" on their right edges is replaced with the variable "t1". By doing so, these four substitution statements become "y=fnc(t1)", "z=t1+5", "a=b+13*t1", and "a=540/t1". After completing this substitution, the common subexpression optimization unit 1061 arranges this variable "t1" onto the left edge of a substitution statement and sets the replaced expression "x*300" on the right edge, to generate the substitution statement "t1=x*300" which it then inserts into the programs. As a result of this optimization, the operation expressions in the four original substitution statements are deleted, with a variable being generated in their place, so that the effect on the program as a whole or these operation expressions can be reduced to one quarter of the original load. Here, the more such common subexpressions are included in substitution statements, the greater the effect of the optimization by the common subexpression optimization unit 1061.

The constant propagation optimization unit 1062 analyzes whether there is a substitution statement which substitutes a constant into a variable and whether this variable is used (that is, the variable is present on the right edge of a substitution statement) in any of the substitution statements following this substitution statement. This analysis is performed to make the greatest possible reduction in the number of substitution statements which substitute constants into variables. Here, if there is a substitution instruction which substitutes a constant into a variable but there is no other substitution statement which uses this variable, such substitution instruction must be redundant and so can be immediately deleted without affecting the program in any way. If the variable is used in a following substitution statement, the constant propagation optimization unit 1062 analyses whether the substitution statement with this variable on the right edge can be replaced with a constant. In FIG. 5A, the variable b in the source code statement "a=12*b" on Line 7 can be seen to be set to the constant "100" by the substitution statement on Line 3. In order to delete this substitution of the constant 100 into the variable b on Line 3, the constant propagation optimization unit 1062 replaces the variable b in Line 7 with the constant 100, so that the source code statement "a=12*b" becomes "a=12*100".

The copy propagation optimization unit 1063 performs analysis of whether there are any transfer statements, such as "a=b" or "y=x", which simply transfer the value of one variable into another, and whether the variables set by such transfer statements are used in other transfer statements which appear later in the program, This analysis is performed to make the greatest possible reduction in transfer statements which transfer values between variables. This is to say, if a variable-to-variable transfer statement is present in the program but the transfer destination variable is not used by any other statement, the transfer statement must be redundant and so can be immediately deleted without affecting the program in any way. When the transfer destination variable is used in substitution statement later in the program, the copy propagation optimization unit 1063 analyzes whether a substitution statement which has this variable on the right side can be replaced with the transfer source variable. This is to say, the copy propagation optimization unit 1063 makes positive attempts at substitution So that variable-to-variable transfer instructions can be replaced with a variable. If replacement is possible, the variable on the right side of the substitution statement is replaced with another variable.

An example of the above will be explained with reference to Line 9 in FIG. 5A, in which the value of the variable x is transferred into the variable z. In order to delete transfers which are meaningless to the program, the copy propagation optimization unit 1063 searches for uses of the variable z, and finds the substitution statement in Line 9. In order to delete this substitution statement, the copy propagation optimization unit 1063 replaces the variable z in the expression "g2(z)" on Line 10 with the variable x. As a result of this replacement, Line 10 of the program becomes "g2(x)".

The loop invariant statement optimization unit 1064 analyzes whether there are any statements present in loops for which movement to outside the loop does not affect the execution result. In a normal program, instructions which are included in loops can be executed many hundreds or thousands of tines, so that the wasted processing time due to redundant instructions inside loops is hundreds or thousands of times that of the same instructions outside loops. Examples of such instructions are redundant instructions which do not affect the value of a transfer destination variable in any of the hundred or so iterations. On detecting such instructions, the loop invariant statement optimization unit 1064 moves them outside the loops. For the example program shown in FIG. 5A, the statement "a=12*b" on Line 7 is an example of such an instruction which, as shown by Line 4 in FIG. 5B, can be moved outside the loop process which is denoted by the "while" statement on Line 5. This is because no change in the values of variables a and b is detected during the iterations of the loop starting from the "while" statement.

The redundant code optimization unit 1065 deletes statements which have been deemed redundant by the common subexpression optimization unit 1061, the constant propagation optimization unit 1062, and the copy propagation optimization unit 1063. The following is an explanation of the case of the example program shown in FIG. 5A. As described above, variable b on Line 7 is replaced with the constant 100 by the constant propagation optimization unit 1062, and variable z on Line 10 is replaced with the variable x by the copy propagation optimization unit 1063. As a result of such replacement, the substitution statements on Line 3 and Line 9 are judged redundant and are deleted by the redundant code optimization unit 1065. Here, the redundant code optimization unit 1065 also deletes transfer statements which substitute a value into a variable which is subsequently not used by the other statements in the program.

The register allocation unit 1066 allocates the hardware resources, such as registers and memory addresses, of the target machine to the variables in the program. In performing such allocation, the register allocation unit 1066 investigates whether the live ranges of the variables in the programs overlap, and assigns variables with overlapping live ranges to different registers. The register allocation unit also investigates the loop nesting-depth level of each variable and/or the frequency of use of each variable, before assigning a priority to each variable based on its investigation results, It may then proceed to allocate registers to variables in order of the assigned priorities. Here, variables which are not allocated registers are allocated addresses in the stack memory. For the example program of FIG. 5A, variables b and z are not used, and so are not allocated a resource. On the other hand, register D2 is allocated to the variable a and register D3 is allocated to the variable x. The resulting optimized code is shown in FIG. 5C.

The primitive generation unit 107 is a standard construction element in every debugging information generation apparatus and monitors the generation of debugging information by the optimization of the optimization unit 106, at the same time generating primitives when appropriate and recording them in the primitive storage unit 102. Here, "primitives" are a kind of debugging information which show the details of the changes in the source code statements due to the optimization processes of the optimization unit 106.

The optimization of the optimization unit 106 is composed of the replacement of subexpressions with variables by the common subexpression optimization unit 1061, the replacement of variables with constants by the constant propagation optimization unit 1062, the replacement of variables with other variables by the copy propagation optimization unit 1063, the movement of statements front inside loops to outside by the loop invariant statement optimization unit 1064, the deletion of redundant statements by the redundant code optimization unit 1065, and the allocation of registers and addresses in stack memory by the register allocation unit 1066, with primitives being generated by the primitive generation unit 107 at all of these optimization stages.

The following is an explanation of the different kinds of primitive and their different forms of expression, with reference to FIG. 6A. This figure shows the expression formats of the different kinds of primitives and their respective meanings in the form of a correspondence table.

In the correspondence table, primitives are broadly classified into "primitives for variables", "primitives for subexpressions", and "Primitives for lines". Of these, primitives for variables are made up of "deleted variables", "moved variables", "replaced variables", and "resources for variables", while primitives for lines of source code are made up of "deleted lines" and "moved lines".

The entry "delete x1" in the expression format column is an example of a "deleted variable" primitive, with its meaning being given in the meaning column to the right. This shows that the expression "delete x1" signifies the deletion of variable x1. Note that this variable is not related to the example program of FIG. 5A.

The entry "move x2 To: Line 1" in the expression format column is an example of a "moved variable" primitive, with its meaning being given in the meaning column to the right. This shows that the expression "move x2 to Line 1" signifies the movement of variable x2 to Line 1. Again note that this variable is not related to the example program of FIG. 5A.

The expressions "replace x3→y1", "replace x4→5" in the expression format column are examples of "replaced variable" primitives, with their respective meanings being given in the meaning column to the right. These show that the expression "replace x3→y1→" signifies the replacement of variable x3 with the variable y1 and the expression "replace x4→5" signifies the replacement of the variable x4 with the constant 5. Again note that these variables are not related to the example program of FIG. 5A.

The relationship between the various optimization processes and the generated primitives is shown in FIG. 6B. Here, FIG. 6B shows which of the different kinds of primitives shown in FIG. 6A are generated when each of the optimization processes is performed. In this table, the word "generation" is given in the "subexpression replaced" column and the "generated statement" column for the "common subexpression optimization" row, showing that these kinds of primitives are generated by the primitive generation unit 107 when optimization is performed by the common subexpression optimization unit 1061. Here, when the subexpressions used in a plurality of source code statements are replaced with a variable by the common subexpression optimization unit 1061, "subexpression replaced" primitives are generated. Also, when the common subexpression optimization unit 1061 generates a source code statement by placing the subexpression in question on the right side and the variable used in replacement on the left, the primitive generation unit 107 generates a "generated statement" primitive.

In the table in FIG. 6B, the word "generation" is given in the "replaced variable" column and the "deleted line" column for the "constant propagation optimization" row, showing that these kinds of primitives are generated by the primitive generation unit 107 when optimization is performed by the constant propagation optimization unit 1062. This is to say, when the optimization unit 106 is activated, the primitive generation unit 107 commences to observe the operations of the optimization unit 106 so that when a plurality of variables in source code statements are replaced with constants by the constant propagation optimization unit 1062, a "replaced variable" primitive is generated. After the processing of the constant propagation optimization unit 1062 has been completed, the redundant source code statements are deleted, and a "deleted line" primitive is generated by the primitive generation unit 107.

In the table in FIG. 6B, the word "generation" is given in the "replaced variable" column and the "deleted line" column for the "copy propagation optimization" row, showing that these kinds of primitives are generated by the primitive generation unit 107 when optimization is performed by the copy propagation optimization unit 1063. This is to say, when the optimization unit 106 is activated, the primitive generation unit 107 commences to observe the operations of the optimization unit 106, so that when a plurality of variables in source code statements are replaced with another variable by the constant propagation optimization unit 1063, a "replaced variable" primitive is generated. After the processing of the copy propagation optimization unit 1063 has been completed, the redundant source code statements are deleted, and a "deleted line" primitive is generated by the primitive generation unit 107.

Here, when the redundant code optimization unit 1065 deletes transfer statements which substitute a value into a variable which is subsequently not used by the other statements in the program, the primitive generation unit 107 again generates a "deleted variable" primitive and a "deleted line" primitive.

The following is an explanation of the operation of the primitive generation unit 107 which will refer to the example program shown in FIG. 5A. At the same time as the constant propagation optimization unit 1062 replaces the variable b in Line 7 of the program in FIG. 5A with the constant 100, the primitive generation unit 107 outputs the primitive "replace b→100".

At the same time as the variable z in Line 10 is replaced with the variable x by the copy propagation optimization unit 1063, the primitive generation unit 107 outputs the primitive "replace Z→x". After replacement by the constant propagation optimization unit 1062 and the copy propagation optimization unit 1063, Line 7 is moved by the loop invariant statement optimization unit 1064, so that the primitive generation unit 107 outputs the primitive "Move Line To: Line 4" to represent the movement of this line or source code. When Lines 3 and 9 are deleted, "line deletion" primitives are outputted by the primitive generation unit 107.

When the register allocation unit 1066 allocates register D2 to variable a in Line 4 with the setting and reference of this variable being possible in Lines 5, 6, 8, 10, and 11, the primitive generation unit 107 outputs a primitive "resource a:D2" showing the allocation relationship of variable and resource for each of Lines 5, 6, 8, 10, and 11. When the register allocation unit 1066 allocates the register D3 to the variable x, since variable x may be set or referred to in each of lines 6, 8, and 11, the primitive generation unit 107 outputs a primitive "resource x:D3" showing the allocation relationship of variable and resource for each of Lines 8, 10, and 11. As a result, the stored content of the primitive storage unit 102 becomes as shown in FIG. 5D.

Here, the unit of the program for which each primitive is generated is one line of source code. By doing so, one primitive is generated to express the allocation relation between a variable and a resource. It should note here that primitives may be generated for a unit which is smaller than one line of source code, but that the program conversion apparatus of the present embodiment uses a one-line unit since it is designed to provide the user with a development environment for the use of a high-level programming language. As a result, the debugging apparatus which is described later also uses line units when halting operation, which improves the compatibility between the program conversion apparatus and the debugging apparatus. (Note here that the transformation information in the claims refers to a combination of one of the primitives described above and a line number).

The moved line information deletion unit 108 deletes primitives which are included in the substitution statements which have been moved, out of all the primitives which written into the primitive storage unit 102 by the primitive generation unit 107. By deleting such primitives which were included in the moved lines in this way, the moved line information deletion unit 108 reduces the amount of information stored by the primitive storage unit 102. As one example, for the example program of FIG. 5A, the substitution statement "a=12*b" has already been described as being moved from Line 6 to a position after Line 4. As shown in FIG. 5D, "substitution b→100" and "line move-ment To: Line 4" are recorded in the column which corresponds to Line 7 in the generated code storage unit 103, corresponding to this substitution statement "a=12*b". In the column corresponding to this Line 7 in the generated code storage unit 103 shown in FIG. 5D, the primitive "line movement To: Line 4" expresses movement of the line, while the other primitive "substitution b→100" expresses a replacement. By deleting these primitives, the moved line information deletion unit 108 is able to reduce the total amount of primitive information.

The invariant variable information deletion unit 109 deletes primitives which express allocation relations between redundant variables and resources, out of the primitives remaining after the deletion by the moved line information deletion unit 108. The expression "invariant variable" here refers to a variable which in neither present in a program line, nor included in a primitive which expresses replacement or movement.

For the example program in FIG. 5A, variable a is such an invariant variable, since it is not present on any of the lines in the program. The primitive "resource a: D2" is outputted for each of Lines 5, 6, 10, and 11, showing the resource allocation for variable a, but these are merely primitives expressing a resource for an invariant variable, so that these primitives "resource a: D2" are deleted for each of Lines 5, 6, 10, and 11. However, since variable a is present in the source code statement on Line 8, the primitive "resource a: D2" is not deleted.

Variable x on Line 10 is a further example of a variable which is not used in the program, and a primitive "resource x: D3" is outputted for the allocation relationship of a resource with this variable, but in this case, the primitive is not deleted. This is because variable x is also present in the outputted primitive "replace z→x" with expresses a replacement. As a result, the primitive "resource x: D3" for Line 11 expressing the allocation relationship of resource and variable is not deleted.

When a "deleted line" primitive is generated by the primitive generation unit 107, the invariant variable information deletion unit 109 detects replacement primitives and resource allocation primitives which have a same line number as a source code statement included in a "deleted line" primitive, before deleting the detected primitives.

When primitives are deleted by the moved line information deletion unit 108, the stored content of the primitive storage unit 102 is transformed from the content shown in FIG. 5D to that shown in FIG. 5E.

Figure 7:
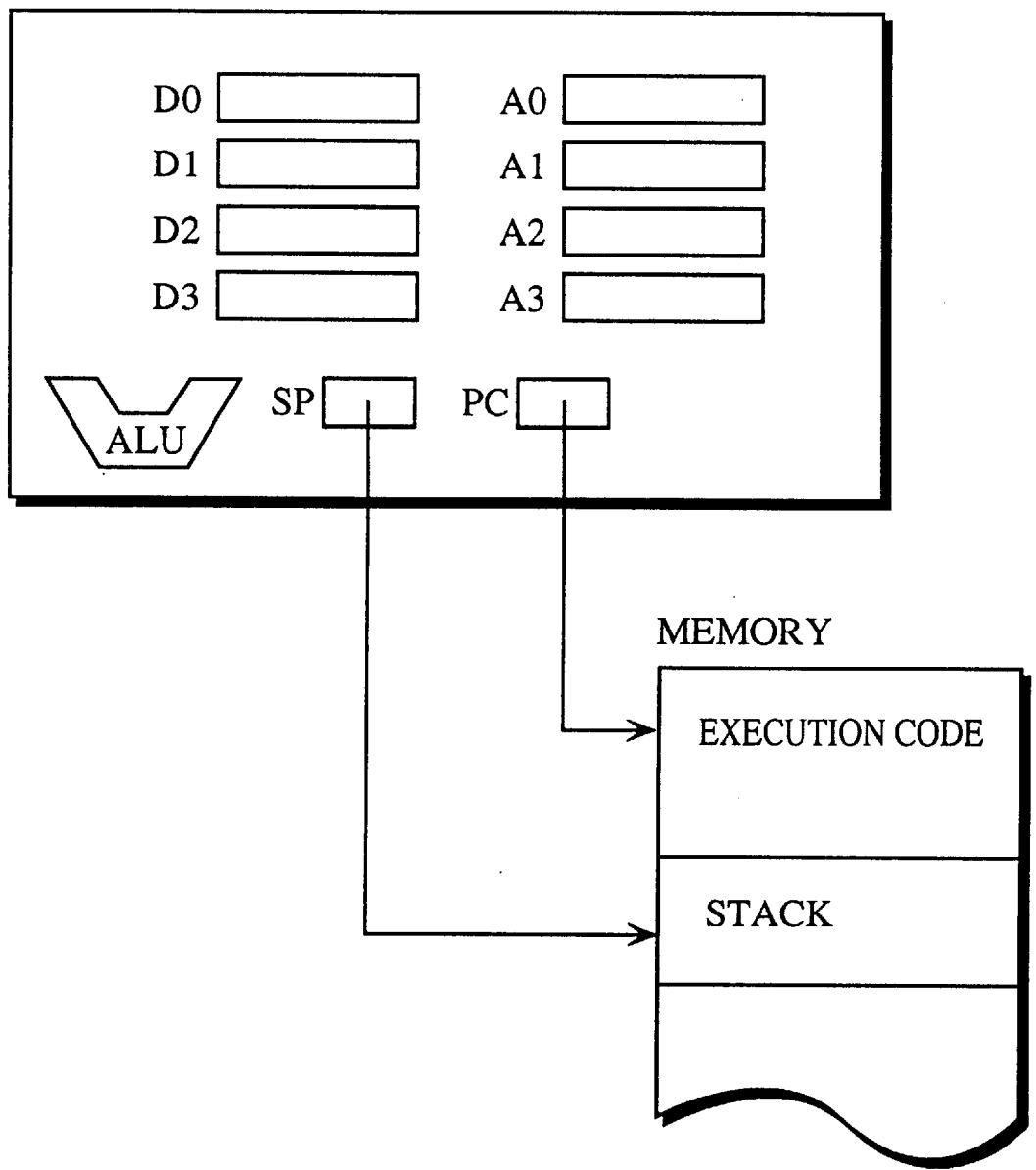
FIG. 7 shows the hardware model for the present embodiment.

The code generation unit 110 converts the program rewritten by the optimization unit 106 into execution code and stores the result in the generated code storage unit 103. Here, "execution code" refers to code which can be decoded and executed by the hardware of the target machine. Of special note here is the scale of the target machine, with the program conversion apparatus or the present embodiment generating execution for a system having the hardware model shown in FIG. 7. Here, the central processing unit (CPU) shown in FIG. 7 is fundamentally equipped with the data registers D0, D1, D2, and D3, the address registers A0, A1, A2, and A3, and an arithmetic logic unit (ALU). The CPU is additionally provided with a program counter PC which shows what address is currently being executed, and a stack pointer SP which expresses a starting address in a current stack. Here, the execution code and stack are located in memory.

FIG. 8A shows the code which is generated by the present program conversion apparatus for the hardware model shown in FIG. 7. In the generated code of FIG. 8A, registers are used as storage addresses of arguments and return values when a function is called, with the registers which are used by the function being saved at the start of the function and restored at its end.

The following is an explanation of the meaning of the execution code at each address in FIG. 8A.

The expression "test:" before 0×100 represents a label.

The execution code at 0×100 expresses the storing of register values.

The execution code at 0×104 expresses a call of the subroutine "_init".

The execution code at 0×108 expresses the substitution of the instant value "12" into register D2.

The execution code at 0×10C expresses the multiplication of register D2 and the value 100, and the substitution of the result into register D2.

The expression "Loop:" between 0×10C and 0×110 represents a label.

The execution code at 0×100 expresses a call of the subroutine "_getData 1".

The execution code at 0×114 represents the substitution of the stored value of register D0 into register D3 to transfer the return value of the function.

The execution code at 0×118 represents the substitution of the stored value of register D2 into register D0 to transfer an argument.

The execution code at 0×11C expresses a call of the subroutine "_g1".

The execution code at 0×120 expresses the substitution of the stored value of register D3 to transfer an argument into register D0.

The execution code at 0×124 expresses a call of the subroutine "_g2".

The execution code at 0×128 expresses the substitution of the stored value of register D3 to transfer an argument into register D0.

The execution code at 0×12C expresses a call of the subroutine "_g3".

The execution code at 0×130 expresses a jump to the label "Loop:".

The execution code at 0×134 expresses a restoring of the register values.

The execution code at 0×138 expresses a return from the subroutine "test" to the function which made the call.

When the program in the internal expression state has been converted into execution code by the code generation unit 110, the line-address information generation unit 111 writes the line-address information, which shows the relationship between lines in the program and the addresses of the generated execution code, into the line-address storage unit 1041. It also outputs information relating to the relationship between functions and addresses and information relating to the variables in functions into the function information storage unit 1042. As a result, the content of the debugging information storage unit 104 becomes as shown in the FIG. 8B.

The following is an explanation for the construction of the debugging apparatus of the present embodiment, with reference to FIG. 4. This debugging apparatus is made up of an input unit 201, a moved/deleted variable judgment unit 202, a breakpoint setting unit 203, a primitive combining unit 204, a combination activation judgment unit 205, a code execution unit 206, a variable operation unit 207, an output unit 208, a line display unit 209, a line information display unit 210, an operation-possible variable display unit 211, an optimization process display unit 212, a variable order switching unit 213, a variable automatic display unit 214, and a linked display control unit 215.

Figure 9A:
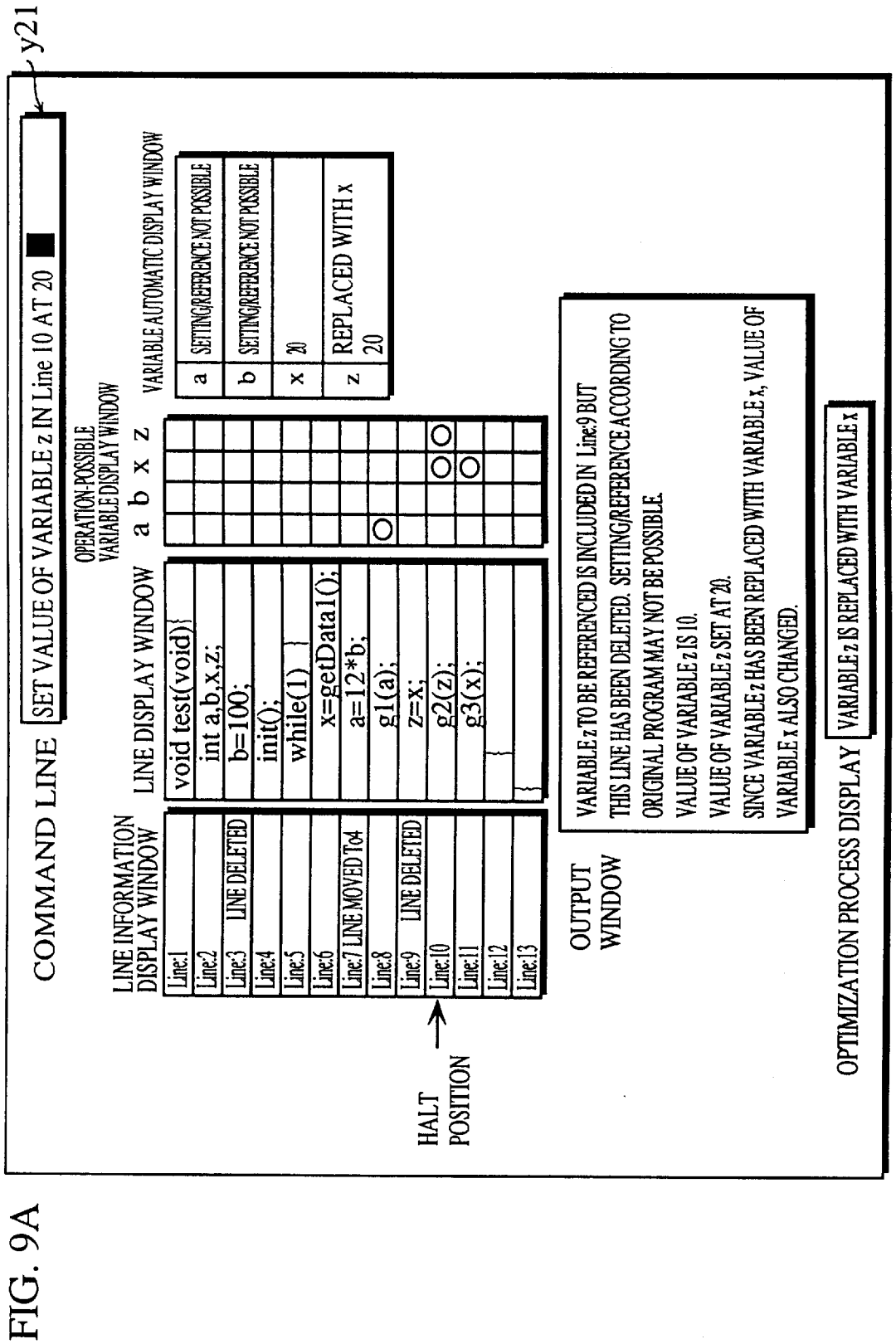
FIG. 9A shows an example display on the display 502 composed of the displays by the output unit 208, the tine display unit 209, the line information display unit 210, the operation-possible variable display unit 211, the optimization process display unit 212, and the variable automatic display unit 214.

The input unit 201 displays a command line on the display 502 and interprets a user input of a "Variable to be viewed" or "Variable to be set and setting value" made using a keyboard. This interpretation of the command line by the input unit 201 is performed in "Show value of variable* on Line **" and "Set value of variable* on Line  at " format. An example display on the display 502 is shown in FIG. 9A, with the command line being located at the position indicated by arrow y21 and being in a state where it is waiting for a user input.

The moved/deleted variable judgment unit 202 investigates whether there is a possibility of the setting or reference of a variable inputted into the input unit 201 is prevented due to the effects of optimization.

Figure 10:
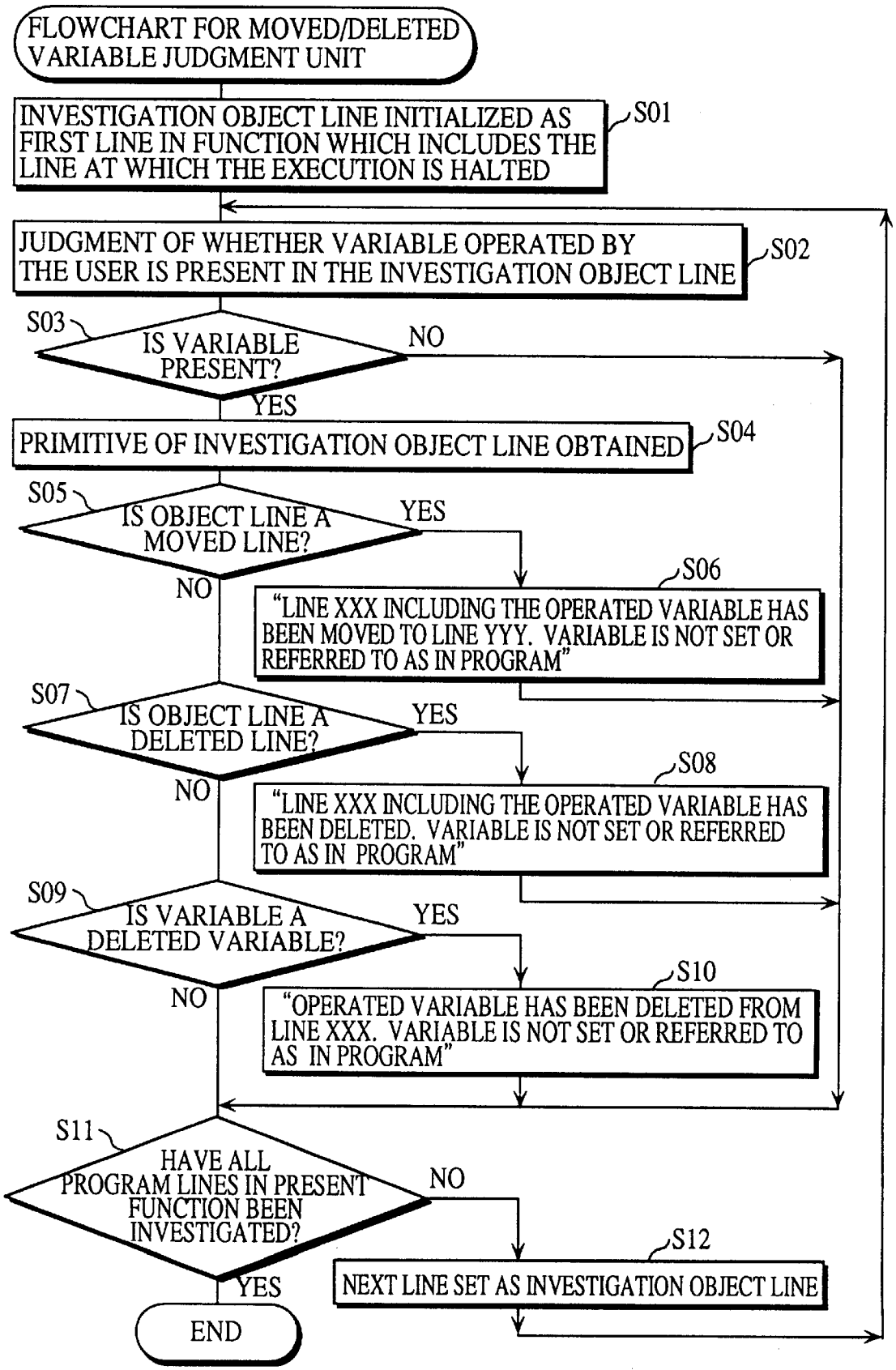
FIG. 10 is a flowchart for the processing content of the moved/deleted variable judgment unit 202.

The following is a detailed explanation of the above process with reference to the flowchart in FIG. 10. In step S1, the investigation object line is initialized so that the investigation object line is set as the first line in a function (this function being the function which includes the line at which the execution has currently been stopped). In step S2, the program is obtained from the program storage unit 101 and it is investigated whether a variable which is the variable indicated by the input unit 201 for reference or setting is present in the investigation object line, and if not present, the judgment "No" is given in step S3 so that the processing advances to step S11. In step S11, it is judged whether the investigation object line is the final line in the function, and if not, the processing advances to step S12 which is an incrementing step in which the next line is set as investigation object line, before the processing returns to step S2.

The processing in steps S2, S3, S11, and S12 is repeated until the judgment "Yes" is made in step S3, which is to say, until a line which includes the variable indicated by the input unit 201 is reached. Once the judgment "Yes" is given in step S3, the primitive for the line in question is investigated in step S4 and one of steps S6, S8, and S10 is selectively performed based on the nature of this primitive. This selection is made by progressively performing the judgments in steps S5, S7, and S9 until the judgment "Yes" is given.

The investigation of a primitive in step S4 is performed by obtaining the primitive from the primitive storage unit 102 and judging whether the investigation object line is moved during optimization, is deleted during optimization, or contains a variable which is deleted during optimization.

If the primitive is a "moved line" primitive, the judgment "Yes" is given in step S5 and information as to the movement from which line to which line is obtained from the primitive, with an indication being given to the output unit 208 to output "Line XXX including the operated variable has been moved to Line YYY. Variable is riot set or referred to as in program" to the display 502. Here, Line XXX is the investigation object line and Line YYY is the movement destination line.

If the judgment "No" is given in step S5 and the judgment "Yes" is given in step S7, an indication is given in step S8 to the output unit 208 to output "Line XXX including the operated variable has been deleted. Variable is not set or referred to as in program to the display 502. Here, Line XXX is the investigation object line.

If the judgment "No" is given in step S7 and the judgment "Yes" is given in step S9, an indication is given in step S8 to the output unit 208 to output "Operated variable has been deleted from Line XXX. Variable is not set or referred to as in program" to the display 502, Here, Line XXX is the investigation object line.

By having the operations in steps S6, S8, and S10 selectively performed, a judgment is made as to whether the variable for which the user wishes to make an operation is included in a moved or deleted line, and if so, the user is informed of a deleted or moved line and that it may not be possible to refer to or set the variable as in the program, The breakpoint setting unit 203 receives a breakpoint indication from the user which is made in line units, converts the indicated breakpoint into an address in the execution code, and sets a breakpoint at the converted address in the execution code. When setting such a breakpoint on a line, there is the danger that the indicated line may be a moved line. Accordingly, the breakpoint setting unit 203 receives information from the primitive storage unit 102 and judges whether the indicated line is a moved line. If the indicated line is a moved line, it gives the output unit 208 an indication to output a display showing that the execution order is not the same as the original program.

Figure 11:
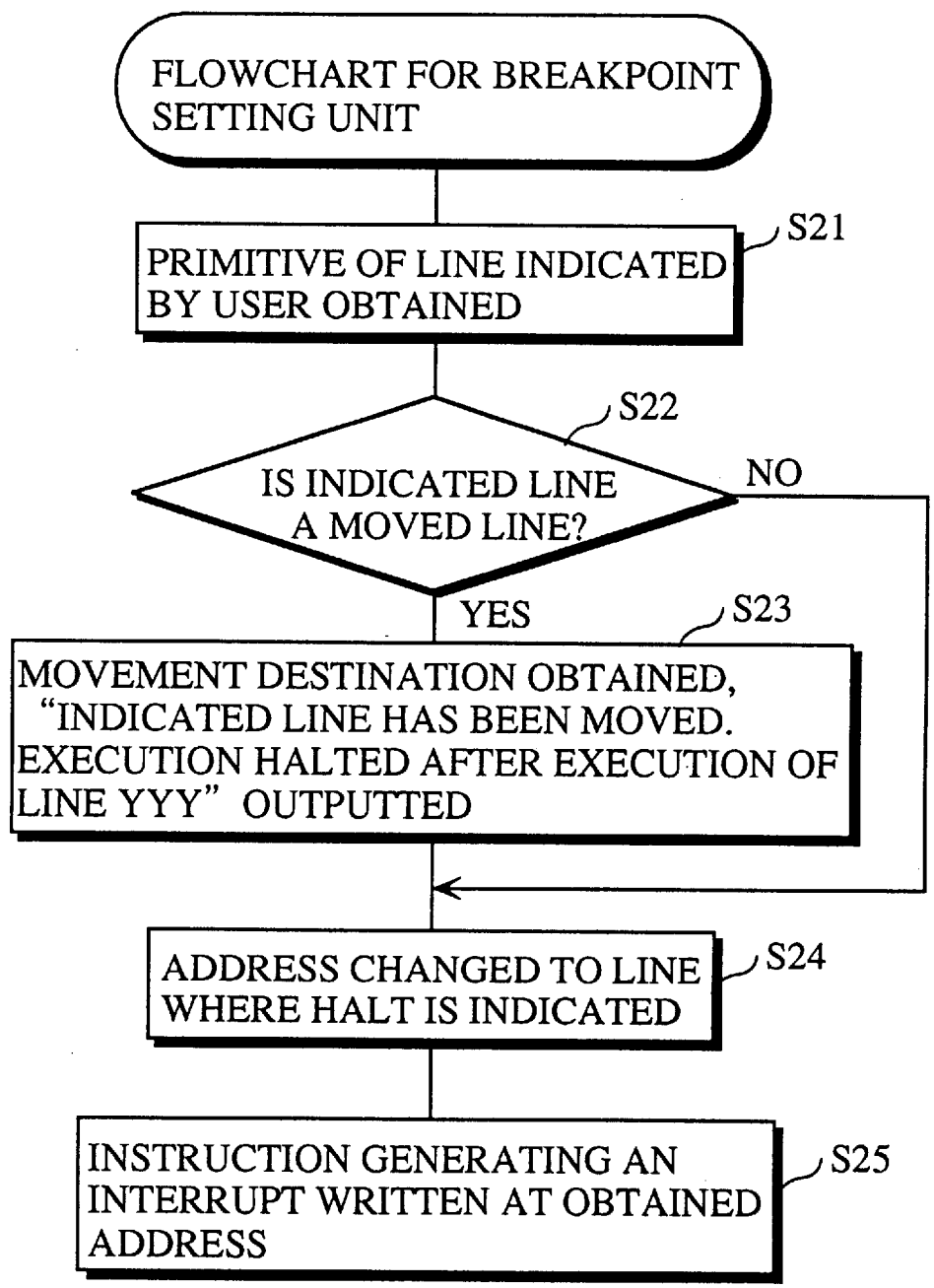
FIG. 11 is a flowchart for the processing content of the breakpoint setting unit 203.

The algorithm of the breakpoint setting unit 203 is explained in more detail below, with reference to the flowchart in FIG. 11. Here, the case when the user requests the breakpoint setting unit 203 to set a breakpoint at the substitution statement on Line 7 will be explained.

In step S21, the primitive of the line indicated by the user is obtained from the primitive storage unit 102. When the line indicated by the user is Line 7, the line is appended with a "moved line" primitive, so that this is obtained by the breakpoint setting unit 203. In step S22, the breakpoint setting unit 203 judges whether the obtained primitive relates to a moved line. Since Line 7 is moved to a position following Line 4, the breakpoint setting unit 203 obtains the line number YYY of the movement destination from the primitive for Line 7 and has the message "Indicated line has been moved. Execution halted after execution of Line YYY". Since Line YYY is Line 4 in the present case, "Indicated Line 7 has been moved to Line 4. Execution halted after execution of Line 4" is displayed.

After display, the address of the execution code corresponding to the line in the program indicated in step S24 is obtained from the line-address storage unit 1041. In the present case, the address 0×104 of Line 4 is obtained from the debugging information storage unit 104 and in step S25 an instruction which causes an interrupt is written into the obtained address. By doing so, a breakpoint is set at address 0×104.

The primitive combining unit 204 investigates what resources have been allocated to variables by tracing the primitives showing the optimization process stored in the primitive storage unit 102, and to what positions lines are finally moved. Here, if a variable to be investigated is a variable which is deleted from the program by the optimization process, the variable which is used to replace the variable and the resource which is allocated to this substitute variable are obtained.

As one example, suppose the variable to be investigated is variable z. By looking at the primitive of Line 1 which shows the replacement of variable z, it can be seen that variable z is replaced with variable x. By looking at the primitives which show resource allocation, it can be seen that register D3 is the resource for this variable x. By combining these primitives, the relationship "variable z"="variable x"="register D3" can be seen and the new information "variable z"="register D3" is obtained. Once this information has been obtained, it is written into the primitive storage unit 102 in the format "combination z:D3" and the second and following combinations can be omitted.

The combination activation judgment unit 205 judges whether the combination of primitives should be performed when the debugging apparatus is activated or when a variable is referred to. When the combination activation judgment unit 205 judges that the combination of primitives should be performed when the debugging apparatus is activated, it activates the primitive combining unit 204 and has primitives combined for all of the lines before a user indication for the reference of a variable is inputted. Alternatively, when it judges that the combination of primitives should be performed when a variable is referred to, it combines the primitives for a current line only when the user inputs an indication regarding the reference of a variable. The judgment that combination should be performed when the debugging apparatus is activated is made based on the amount of primitive information, the number of lines in the program, and the code size of the execution code. In the present embodiment, when the number of lines in the program is exceeds predetermined number, primitives are combined when the debugging apparatus is activated. For the example program in FIG. 5A, since the program is over ten lines long, the judgment is made to perform combination of primitives in accordance with a user operation.

When a user operation Is to be performed for a variable, the variable operation unit 207 gives a control indication to the code execution unit 206 in accordance with the indicated operation. This "user operation of a variable" is received by the input unit input unit 201, with there being two types of user operation, "setting" and "reference".

When the input unit 201 receives an indication for a reference of a variable, the variable operation unit 207 refers to the correspondence relations between variables and resources included in the primitives stored in the primitive storage unit 102, and gives an indication to the code execution unit 206 to fetch the value of a resource corresponding to the indicated variable. On being thus instructed, the code execution unit 206 fetches the value of the resource and the variable operation unit 207 gives an indication to the output unit 208 to display the variable name together with the fetched value.

On receiving a variable setting indication, and a variable name and desired value from the input unit 201, the variable operation unit 207 refers to the correspondence relations between variables and resources included in the primitives stored in the primitive storage unit 102, and gives an indication to the code execution unit 206 to set the value of a resource corresponding to the indicated variable at the desired value. In this process, when the variable indicated by the user is a replaced variable, the variable operation unit 207 instructs the output unit 209 to output an indication showing that the value of a replaced variable has changed.

When, for example, the user gives an indication for a reference of the variable z in the example program of FIG. 5A, the variable operation unit 207 learns from the primitives stored in the primitive storage unit 102 that the resource allocated to the variable z is register D3, so that the variable operation unit 207 instructs the code execution unit 206 to fetch the value of register D3 which expresses the value of variable z. Once the code execution unit 206 has fetched the value "12" of register D3, the variable operation unit 207 instructs the output unit 208 to display "Value of variable z is 12". At the same time, the variable operation unit 207 refers to the primitives in the primitive storage unit 102 which relate to replacement, and learns that the variable z is replaced with the variable x, so that it instructs the output unit 208 to display "Variable x used to replace variable z, so value variable x also changes".

The code execution unit 206 may be composed of any of a simulator, an incircuit emulator, or a monitor, so that by using the features which are unique to simulators, incircuit emulators, or monitors, the hardware environment of the target machine can be recreated and a plurality of items of execution code stored in the generated code storage unit 103 can be successively executed in this hardware environment until a breakpoint set by the breakpoint setting unit 203 is reached. On reaching a breakpoint, access is performed for a resource it the present hardware environment in accordance with the indication by the variable operation unit 207.

Here, while there are differences between the hardware environments of a simulator, an incircuit emulator, and a monitor (while the hardware environments for a monitor or incircuit emulator are the same or very close to that of the real machine, the hardware environment for a simulator is merely a model which is generated on a host computer) all three hardware environments have a common aspect in that they recreate the functions of the data registers D0, D1, D2, and D3, the address registers A0, A1, A2, and A3, the program counter PC, and the stack pointer SP which are shown in the hardware model of FIG. 7.

Figure 13:
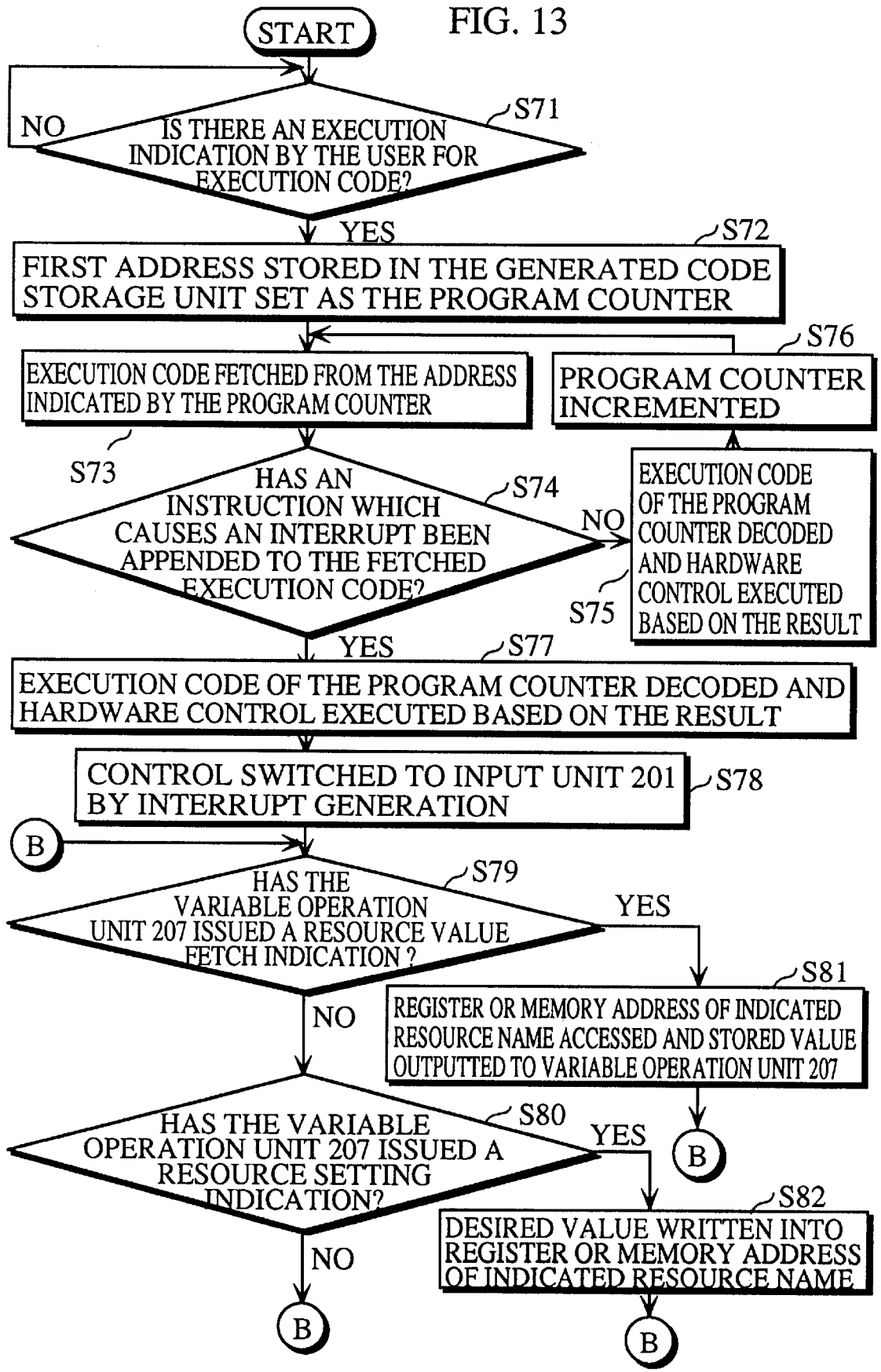
FIG. 13 is a flowchart showing the processing content or the code execution unit 206.

The flowchart in FIG. 13 shows the details of the processing performed by the code execution unit 206, In step S71, the breakpoint setting unit 203 waits for the user to have the execution code executed, and when the user gives such an indication, the processing advances to step S72 where the first address "0×100" stored in the generated code storage unit 103 is set in the program counter. Next, in step S73, the code at the address stored in the program counter is fetched from the generated code storage unit 103 and it is judged in step S74 whether the fetched execution code has been appended with an instruction which causes an interrupt. Here, an "instruction which causes an interrupt" is an instruction which has been written at a breakpoint setting destination address by the breakpoint setting unit 203. It such an instruction is written at the address "0×10C", the judgment in step S74 when the execution code at address "0×100" has been fetched is "No", so that the execution code at address "0×100" indicated by the program counter is executed in step S75. As a result, the stored values of the data registers and address registers in the hardware model shown in FIG. 7 are saved in the stack. After saving, the program counter is incremented to "0×104" in step S76 and the processing returns to step S73.

In step S73, the code at the address "0×104" stored in the program counter is fetched from the generated code storage unit 103 and it is judged in step S74 whether the fetched execution code has been appended with an instruction which causes an interrupt. This is not the case, so that the judgment "No" is giver and the execution code fetched from the address "0×104" is executed in step S75. In executing this execution code, first the code "call__init" is decoded and the starting address of "init" is stored in the program counter, before the program counter is incremented to "0×108" in step S76 and the processing returns to step S73. It should be noted here that the processing of the code execution unit 206 in fact needs to switch to the processing for the subroutine "init", although, for ease of understanding, the code execution unit 206 is described here as merely advancing to the next address "0×108", in FIG. 8A.

In step S73, the code at the address "0×108" stored in the program counter is fetched from the generated code storage unit 103 and it is judged in step S74 whether the fetched execution code has been appended with an instruction which causes an interrupt. This is not the case, so that the judgment "No" is given and the execution code fetched from the address "0×108" is executed in step S75. In performing this execution, the execution code "mov 12, D2" at address "0×108" is decoded and the immediate value 12 is stored in the data register D2, before the program counter is incremented to "0×10C" in step S76 and the processing returns to step S73.

In step S73, the code at the address "0×10C" stored in the program counter is fetched from the generated code storage unit 103 and it is judged in step S74 whether the fetched execution code has been appended with an instruction which causes an interrupt. Since this is the case for the execution code at the address "0×10C", the judgment "Yes" is given in step S74 and the execution code at the address 0×10C" stored in the program counter is executed in step S77. In performing this execution, the execution code "mul 100, D2" at address "10×10C" is decoded, the ALU performs the multiplication of the stored value of the data register D2 and the immediate value 100, and the result "1200" is stored in the data register D2, before the processing advances to step S79.

In step S78, an interrupt signal is generated in accordance with the interrupt instruction stored at the address "0×10C", and the code execution unit 206 switches control to the input unit 201. By switching control to the input unit 201, the command line described above is displayed in its input reception state. Here, when the code execution unit 206 receives an indication for reference of a variable from the user, the variable operation unit 207 refers to the primitive storage unit 102 to find which resource has been allocated to the indicated variable, and instructs the code execution unit 206 to fetch the stored value of the indicated resource.

In steps S79 and S80, the code execution unit 206 waits for an indication to fetch the value of a resource, and on receiving such an indication, the judgment "Yes" is given in step S79 and the processing advances to step S81, where the code execution unit 206 accesses the register or memory address indicated by the resource name and outputs the value of the resource to the variable operation unit variable operation unit 207.

When an indication for setting the value of a resource is received in the input reception state with the command line being displayed, the variable operation unit 207 refers to the primitive storage unit 102 to find the resource which has been allocated to the indicated variable, before instructing the code execution unit 206 to set the stored value of the resource in question at the desired value.

Once there has been an indication for a setting of a resource value, the judgment "Yes" is given in step S80 and the processing advances to step S81, where the code execution unit 206 writes the desired value into the register or memory address which corresponds to the indicated resource name.

The output unit 208 displays responses to the operations made by the user via the input unit 201 in the output window, in accordance with indications from the input unit 201, the moved/deleted variable judgment unit 202, the breakpoint setting unit 203, and the primitive combining unit 204.

The line display unit 209 displays a list made up of a plurality of generated source files, and waits for an indication by the user of a subroutine whose operation is to be verified. On receiving such a user indication, the line display unit 209 extracts the source code statements included in the indicated subroutine and displays them in a fixed window. After this, the execution code included in the machine language program which corresponds to the display source code statements is displayed in the window next to the source code statements. Here, an arrow is also displayed to indicate the line which is the present execution halt position (the line where the breakpoint setting unit 203 has set a breakpoint).

The line information display unit 210 displays, in the line information display window, the primitives which show how each line in the line display window has been optimized in a punctuated format which is understandable to the user. The line information display window has a number of horizontal entry rows which are numbered to show the line of the program included in the line display window to which they correspond. By aligning the entries in the line display window and the line information display window, the user is able to understand how each line displayed by the line display unit 209 has been optimized. For the example shown in FIG. 9A, the line information display window shows that Line 7 has been moved and that Lines 3 and 9 have been deleted. By displaying this information, the user can soon understand which parts of the program which he/she wrote are redundant.

The operation-possible variable display unit 211 displays variables in each line in the line display window that can be set or referred to with a mark in the operation-possible variable operation window. The operation-possible variable operation window has rows which are aligned with each row in the line display window, with each column being assigned to one of the variables used in the program. Here, the operation-possible variable display unit 211 finds out which variables in which lines can be set or referred to by the user, and adds a mark "○" to such lines when a variable is present in a primitive or debugging information, to show the variables for which reference or setting is possible.

The operation-possible variable display unit 211 performs conversion control of the line display unit 209 so that the variables for which reference of the stored value or setting of the stored value is possible can be clearly seen.

Figure 12:
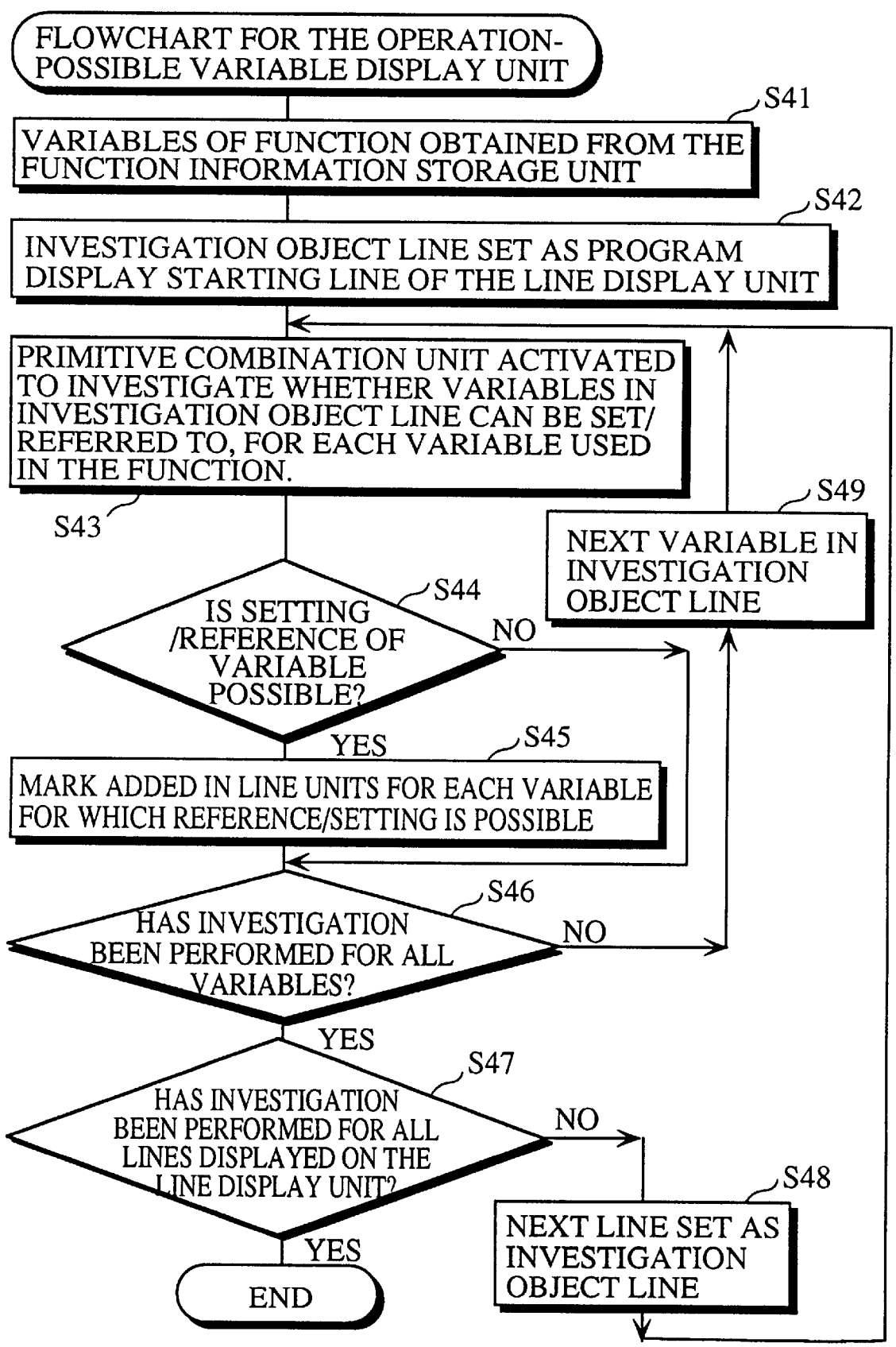
FIG. 12 is a flowchart for the processing content of the operation-possible variable display unit 211.

The flowchart in FIG. 12 shows the details of the algorithm of the operation-possible variable display unit 211. In this flowchart, S41 is an initialization step for setting the investigation range for variables, so that the investigation range is limited to the variables used by the present function which are found from the function information storage unit 1042 step S42 is an initialization step for setting the investigation object line, which sets the first line in the program displayed by the line display unit 209 as the investigation object line. In step S43, the operation-possible variable display unit 211 uses the primitive combining unit 204 to investigate whether setting/reference is possible for each variable used in the function of the investigation object line. Here, the state "setting possible" is judged as the case when a resource corresponding to the variable indicated by the input unit 201 exists. Similarly, the state "reference possible" is judged as the case when a resource corresponding to the variable indicated by the input unit 201 exists, or when the variable has been replaced by another variable or by a constant.

When, in step S44, it is judged that setting or reference is possible for the variable, the processing advances to step S45 where a mark is added to the line which is the investigation object line.

Step S46 is a termination judgment step where it is judged whether the investigation has been performed for all of the variables in the investigation object line. Here is a variable is still remaining, the processing advances to step S49 where the next variable in the investigation object line is selected and the processing returns to step S43.

If, instep S46, the investigation has been performed for all variables the processing advances to step S47, where it is judged whether the investigation has been performed for all lines in the program displayed by the line display unit 209. If this is not the case, the processing advances to step S48 where the next line is selected as the investigation object line and the processing returns to step S48.

The variable order switching unit 213 switches the line display of the program in accordance with user indications. Two types of user indications, "Display in program order" and "Display in moved order after optimization", are possible. If the user gives a "Display in moved order after optimization" indication, the variable order switching unit 213 displays lines after first moving them in accordance with primitives in the primitive storage unit 102 which reflect the movement of lines to positions following other lines. Here, the order of the displayed lines by the line information display unit 210 and the operation-possible variable display unit 211 are similarly rearranged.

The variable automatic display unit 214 displays the values of variables in the line where execution is halted and the optimization process, using the primitive combining unit and the variable operation unit.

The linked display control unit 215 performs display control so that the user will be able to instantly recognize the correspondence between the execution code in the vicinity of the breakpoint and the lines of the program. Here, when the display starting line is changed, the linked display control unit 215 changes the display starting positions of both the program and the execution code together. Here, up and down cursor keys are used as the indication method of the lines to be displayed.

Figure 14A:
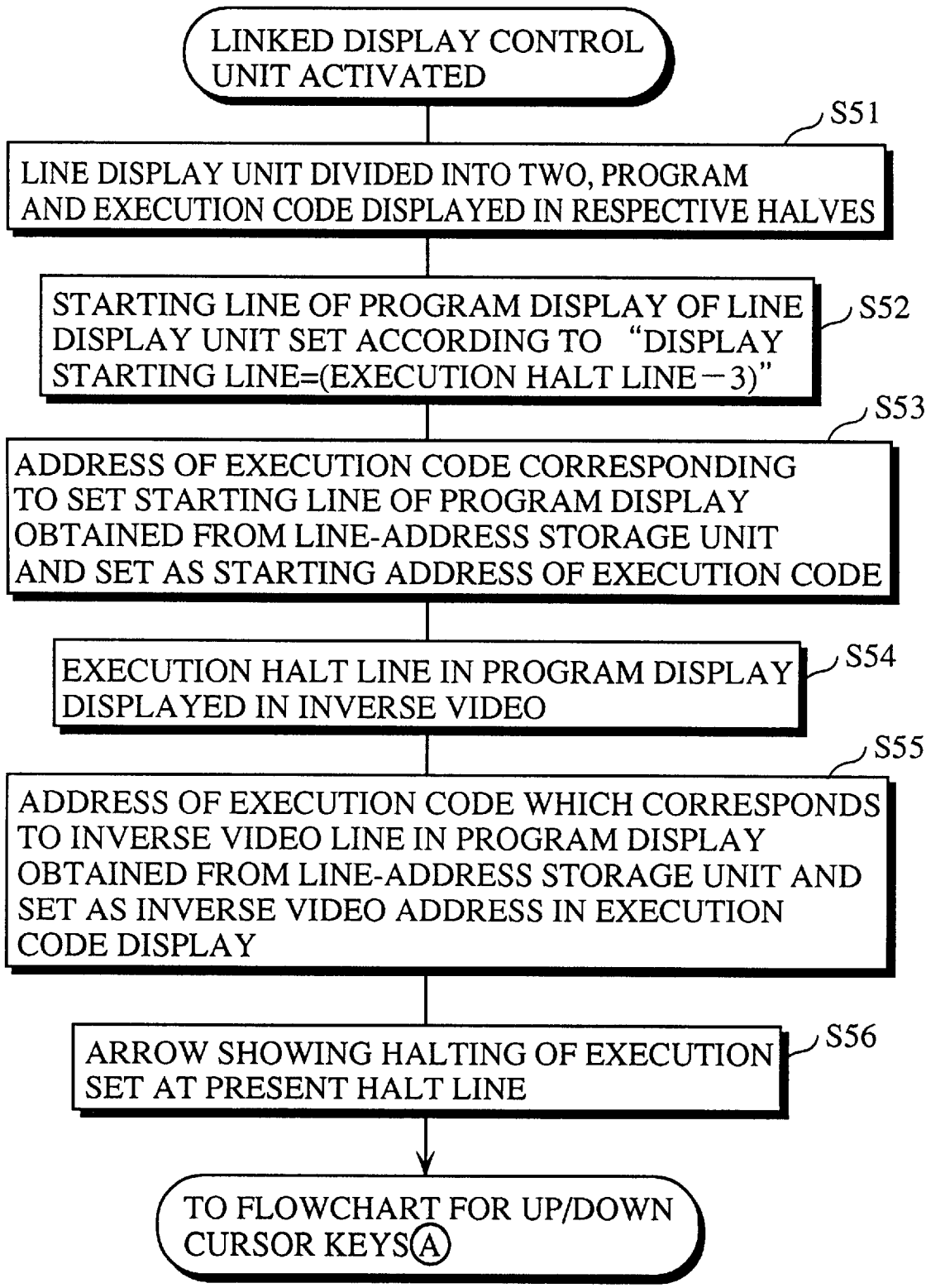
FIG. 14A is a flowchart showing the processing content of the linked display control unit 215.
Figure 14B:
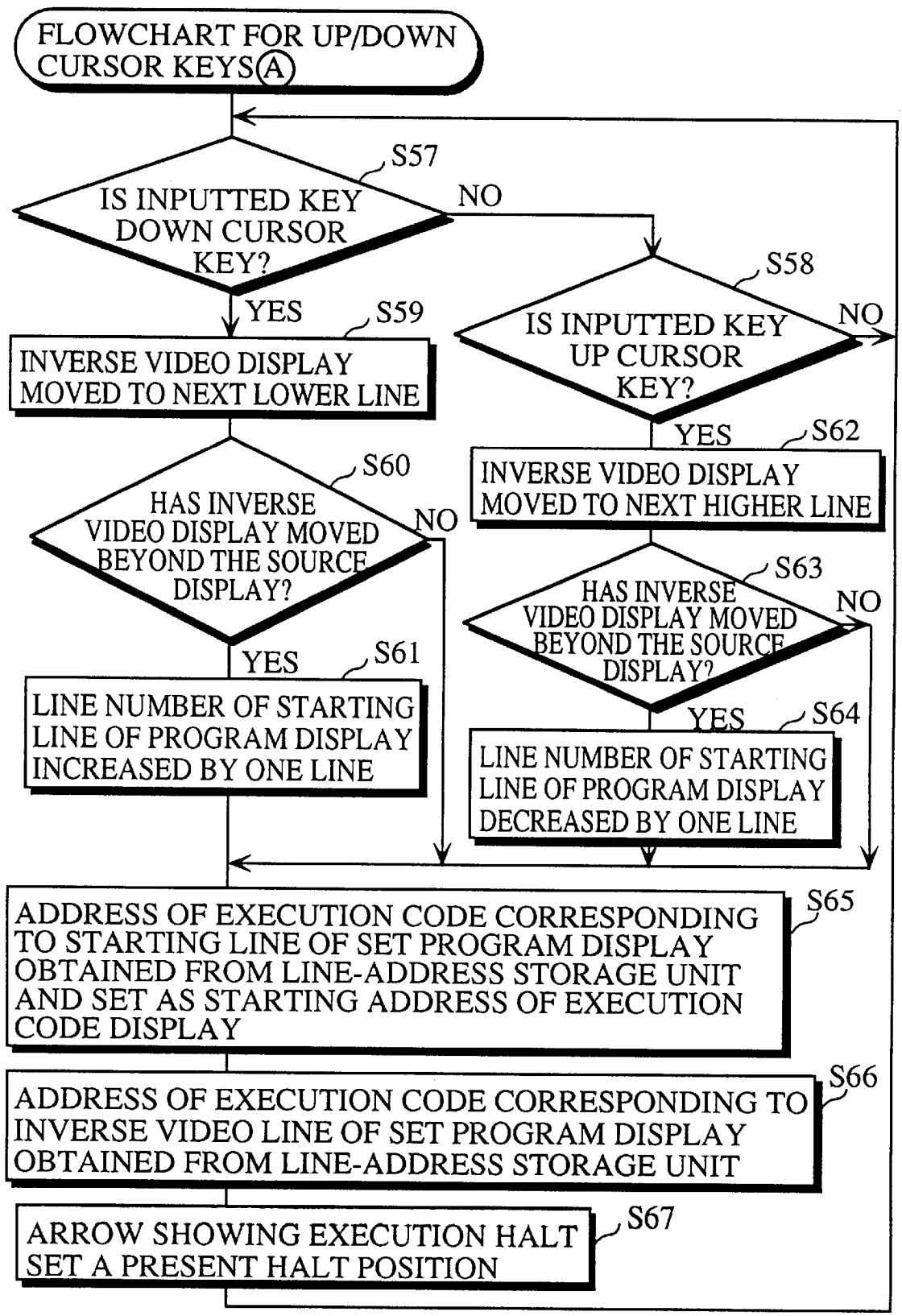
FIG. 14B is also a flowchart for the processing content of the linked display control unit 215.

When the user gives an indication for a linked display of the program and execution code, the process shown by the flowcharts in FIGS. 14A and 14B is commenced. In step S51, the display area is divided into two, the program obtained from the program storage unit 101 is displayed in the program display frame, and the execution code obtained from the generated code storage unit 103 is displayed in the execution code display frame.

In step S52, the display starting position is obtained from the expression "display starting line—execution halt line— 3", and is set as the starting line for the display of the program by the line display unit 209. If the present halt line for the example display of FIG. 9A is Line 10, the display starting line for the program display in the linked display will be Line 7.

In step S53, the address of the execution code which corresponds to the set starting line of the program display is obtained from the line-address storage unit 1041 and is set as the display starting address of the execution code for the line display unit 209. In the present example, the value of the address for Line 7 is obtained from the line address information in the debugging information storage unit 104, which in this case gives the address "0×108". As a result, an indication is given to the line display unit 209 to display the program starting from Line 7 and the execution code starting from address "0×108".

In step S54, the line in the program display of the line display unit 209 which is the execution halt line is displayed in inverse video as the initial inverse video position. In the present example, the execution halt position Line 10 is displayed in inverse video.

Figure 15C:
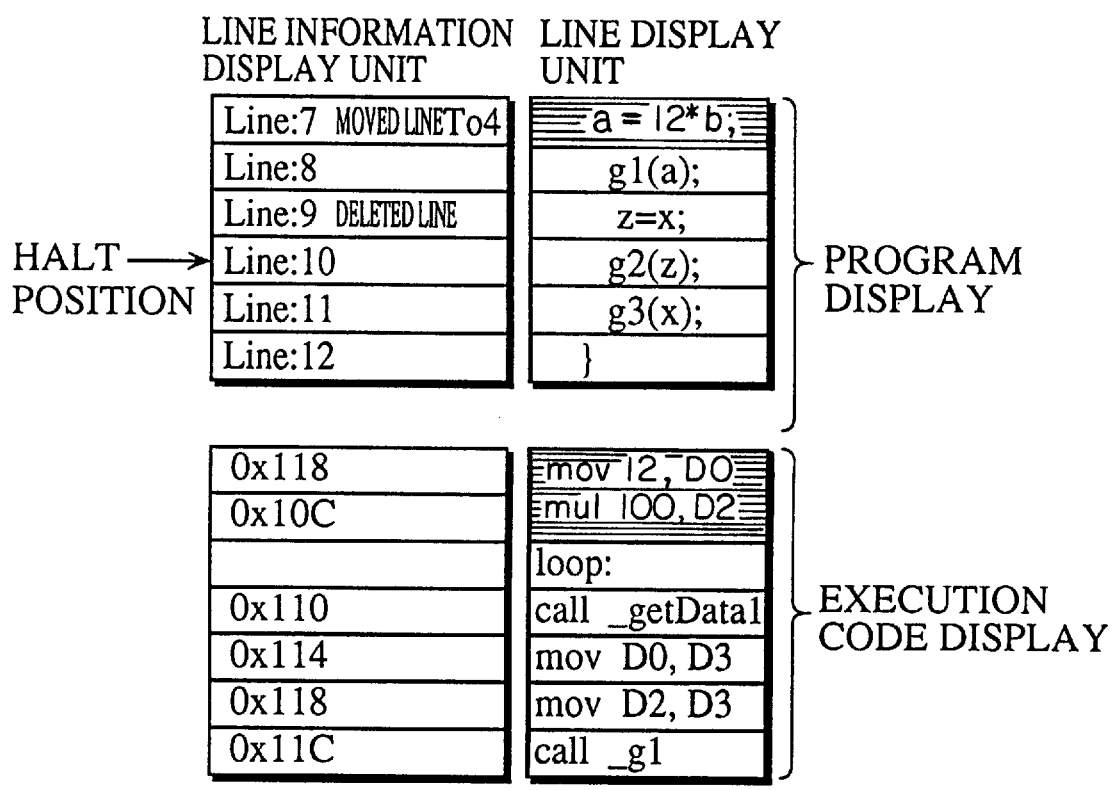
FIGS. 15A–15C shows the changes in the content displayed on the display 502 according to the operations of the linked display control unit 215.
Figure 15A:
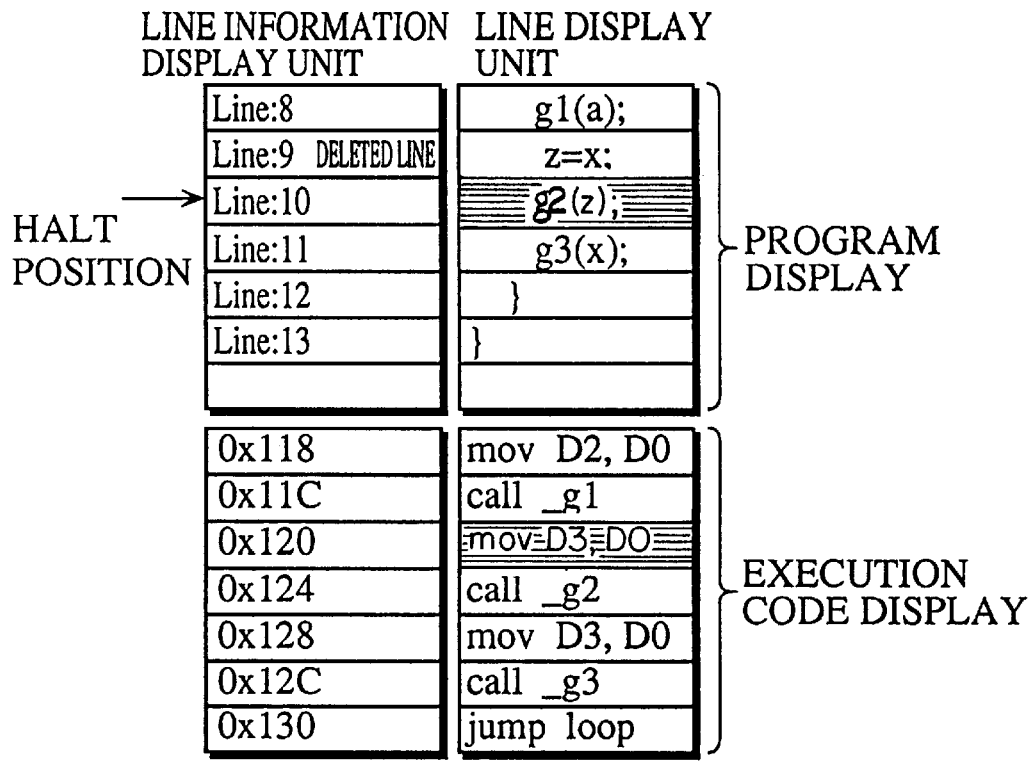
Figure 15B:
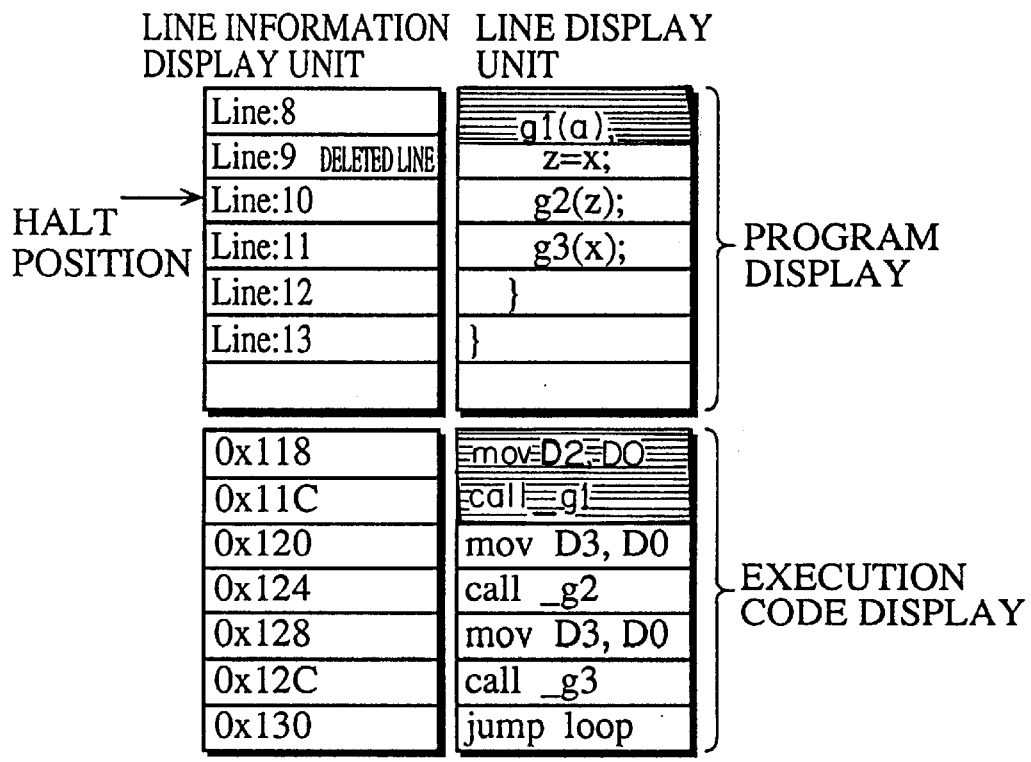

In step S55, the address of the execution code which corresponds to the inverse video line in the program display is obtained from the line-address storage unit 1041, and the line display unit 209 is made to display the execution code at the obtained address in inverse video. In the present example, the address "0x120" is obtained from the line-address storage unit 1041 for Line 10, so that the line display unit 209 is instructed to display the execution code at address "0x120" in inverse video. The result for the present example is shown in FIG. 15A.

In step S56, the arrow which shows the execution halt position in the line display unit 209 is set at the present halt line. In the present example, the present halt line is Line 10, so that an arrow showing this is displayed at Line 10.

The following is an explanation of the algorithm used when the user presses the up or down cursor key, with reference to the flowchart in FIG. 14B.

Steps S57 and S58 are performed to detect whether the up cursor key or down cursor key have respectively been pressed.

When the down cursor key is detected, the processing advances to step S59 where the inverse video part of the program display by the line display unit 209 is moved to the next lower line, while when the up cursor key is detected, the processing advances to step S62 where the inverse video part of the program display by the line display unit 209 is moved to the next higher line.

In steps S60 and S63, it is judged whether the inverse video line has moved beyond the program display of the line display unit 209 at the top or bottom, respectively. In the example display of FIG. 15A, the line display unit 209 is divided into a program display frame and an execution code display frame, with the program display frame showing the program range from Line 8 to Line 13. When the program display frame is limited to such a narrow range, it is easy for the inverse video line to be moved beyond the program display, so that such Movement beyond the present program display is detected in steps S60 and S63.

Steps S61 and S64 are the respective processes which are executed when the inverse video line is determined in one of steps S60 and S63 to have been moved beyond the program display. When it is determined in step S60 that the inverse video line is below the program display, in step S61 the starting line of the program display by the line display unit 209 is increased by one line For the example shown in FIG. 15A, when the inverse video line has been moved beyond the bottom of the program display of Line 8 to Line 13, the starting line for program display is increased by one to become Line 9, so that a five-line range starting from Line 9, which is to say Lines 9 to 14 are displayed by the line display unit 209. In this way, the program scrolls downward.

On the other hand, when it is determined in step S63 that the inverse video line is above the program display, in step S64 the starting line of the program display by the line display unit 209 is decreased by one line. For the example shown in FIG. 15A, when the inverse video line has been moved beyond the top of the program display of Line 8 to Line 13, the starting line for program display is decreased by one to become Line 7, so that a five-line range starting from Line 7, which is to say Lines 7 to 12 are displayed by the line display unit 209. In this way, the program scrolls upward.

Of special note here is when a newly selected inverse video line or starting line has already been moved or deleted, it will no longer be present in the line-address storage unit 1041. However, the linked display control unit 215 also takes the case when such lines are not present in the line-address storage unit 1041 into consideration.

More specifically, in step S65, it is judged whether an address corresponding to the starting line is stored in the line-address storage unit 1041 of the debugging information storage unit 104. If such an address is stored, the address of the execution code corresponding to the set starting line for program display is obtained from the line-address storage unit 1041 and is set as the display starting address for the execution code display by the line display unit 209.

In step S66, it is determined whether addresses corresponding to the starting line and inverse video line are stored by the line-address storage unit 1041 of the debugging information storage unit 104, and if so, the address of the execution code which corresponds to the set inverse video line of the program display is obtained from the line-address storage unit 1041, and the execution code at this address in the execution code display of the line display unit 209 is displayed in inverse video.

In step S67, an arrow showing the present execution halt position is set at an appropriate position by the line display unit 209.

Here, if the user wishes to view a part of the program which is higher up, he/she will press the up cursor key. This key operation is detected in step S58, and in step S62 the linked display control unit 215 changes the inverse video line in the program display by the line display unit 209 from Line 10 to Line 9. In step S63, the inverse video line is judged to have not exceeded the program display, so that in step S65 the linked display control unit 215 attempts to obtain the address corresponding to Line 9 from the line-address storage unit 1041 of the debugging information storage unit 104, but since no such address is present, no inverse video display is performed in the execution code display of the line display unit 209.

Here, if the user wishes to view a part of the program which is higher up, he/she will press the up cursor key. This key operation is detected in step S58, and in step S62 the linked display control unit 215 changes the inverse video line in the program display by the line display unit 209 from Line 9 to Line 6. In step S63, the inverse video line is judged to have not exceeded the program display, so that in step S65 the linked display control unit 215 confirms that there is an address, "0x118", corresponding to Line 9 from the line-address storage unit 1041. The inverse video display in the execution code display is then changed from the execution code at address "0x120" to the code at address "0x118". This results in the display shown in FIG. 15B.

Here, if the user again wishes to view a part of the program which is higher up, he/she will press the up cursor key. This key operation is detected in step S58, and in step S62 the linked display control unit 215 moves the inverse video line in the program display upward by one line. In step S63, it is judged whether the inverse video display has moved beyond the program display, and since the inverse video line, Line 7, is beyond the display starting line, Line 8, this is judged to be the case, so that the display starting line of the program for the line display unit 209 is changed to Line 7.

After the display starting line is changed, the linked display control unit 215 checks that an address, "0x108", is stored in the line-address storage unit 1041 of the debugging information storage unit 104 corresponding to Line 7, before changing the display starting address of execution code for the line display unit 209 to "0x108". After this, the inverse video display line in the program of the line display unit 209 is changed from Line 8 to Line 7, and the inverse video display in the execution code is changed from "0x118" to "0x108". As a result, the display by the debugging apparatus becomes as shown in FIG. 15C.

With the present embodiment described above, the program conversion apparatus can perform a very powerful optimization of a program written in a high-level language, while the record of such optimization being expressed as primitives which are generated for each line in the source code, so that the correspondence between source code statements in the high-level language and each item of execution code can be clearly established, with the changes to the source code statements due to optimization also being clearly shown. When the user indicates a line or variable, the debugging apparatus refers to the primitives stored in the primitive storage unit 102 to give the user direct feedback concerning how the indicated line or variable is changed by optimization, so that programmers can perform operation verification in a high-level language while conscious of the optimization processing.

In this embodiment of the present invention, optimization processes are expressed by the primitive generation unit 107 of the program conversion apparatus using readily understandable information expressed as the replacement of variables, the deletion of variables, the resources for variables, and the movement of lines, so that even if a new optimization process is introduced into the optimization unit 106, this optimization process can be expressed as a combination of the given primitives.

It is also possible for the variable operation unit 207 to give a warning message when the operation object is a replacement variable or a replaced variable. Here, if variable x is replaced with variable y, and the user wishes to make an operation concerning variable y, the output unit 208 may output the message "Variable y is referred to by variable x. The value of variable x will also change", so that no changes to the values of replaced variables will be performed without the user's knowledge.

When the user wishes to set the value of a variable which is the result of a replacement, the variable operation unit 207 can have the output unit 208 output a "Variable is referred to by another variable" message, so that the user can avoid simultaneously changing the value of the other variable by mistake.

When the line for which the breakpoint setting unit 203 sets a breakpoint has been deleted, the output unit 208 can be made to display a "Breakpoint cannot be set since line has been deleted" message.

The operation-possible variable display unit 211 was described as marking replaced variables showing that operations are possible, although it is possible for only variables which have been stored in the stack or variables to which a resource has been assigned to be marked.

The moved/deleted variable judgment unit 202 was described as investigating variables in moved or deleted lines and deleted variables, but by also processing replaced variables, the user can be given a warning when attempting to operate a replaced variable in another line, The line display unit 209 was described as displaying moved lines after movement when the program is displayed in the order of the optimized lines, although by not displaying deleted lines, the optimization result may be shown. Here, replaced variables can also be clearly displayed.

Second Embodiment

In the second embodiment of the present invention, a construction is disclosed in which easier operation of variables is possible, even when subexpressions have been replaced with temporary variables. Here, rig. 16 shows an example program which is used for code generation by the program conversion apparatus of the second embodiment.

The copy propagation optimization unit 1063 analyzes the content of the program of FIG. 16 for which variable t1 is substituted into variable x on Line 5 and variable x is compared with the immediate value "0" on Line 6. On analyzing such content, the copy propagation optimization unit 1063 sees that if variable x on Line 6 is replaced with the variable t1, the substitution of variable t1 into variable x in Line 5 can be deleted. After this, the variable x in the program line "if(x)" is replaced with variable t1 so that Line 6 becomes "if(t1)".

After the copy propagation optimization unit 1063 has completed its replacement process, the common subexpression optimization unit 1061 analyzes Line 5 to Line 9, and finds that the subexpression "x+3" is present on the right edge of both Line 7 "y=x+3" and Line 9 "z=x+3", so that calculation "x+3" is performed twice with no change to variable x in-between. To avoid the redundancy or having this subexpression performed twice, a substitution statement "t2=x+3" is generated to substitute this subexpression on its right edge into variable t2, before replacing the subexpression "x+3" on the right side of Line 7 and Line 9 with the temporary variable t2. As a result, the two iterations of the calculation can be replaced with one iteration of the generated statement "t2=x+3". Here, x is replaced with t1, so that this generated statement is converted to "t2=t1+3". After this replacement, the redundant code optimization unit 1065 deletes the substitution statement on Line 5 "x=t1" which has been made redundant by the variable replacement. The result of this processing is shown in FIG. 17A.

The primitive storage unit 102 stores information about the optimization carried out by the copy propagation optimization unit 1063, with its content being shown in FIG. 17B. As shown in this drawing, variable x on Line 6 has been replaced with variable t1, and the subexpression "x+3" on Lines 7 and 9 has been replaced with the variable t2. The execution code which is generated by the code generation unit 110 for the program shown in FIG. 17A is shown in FIG. 17D, with the line-address correspondence information generated by the line-address information generation unit 111 being shown in FIG. 17C.

Figure 18B:
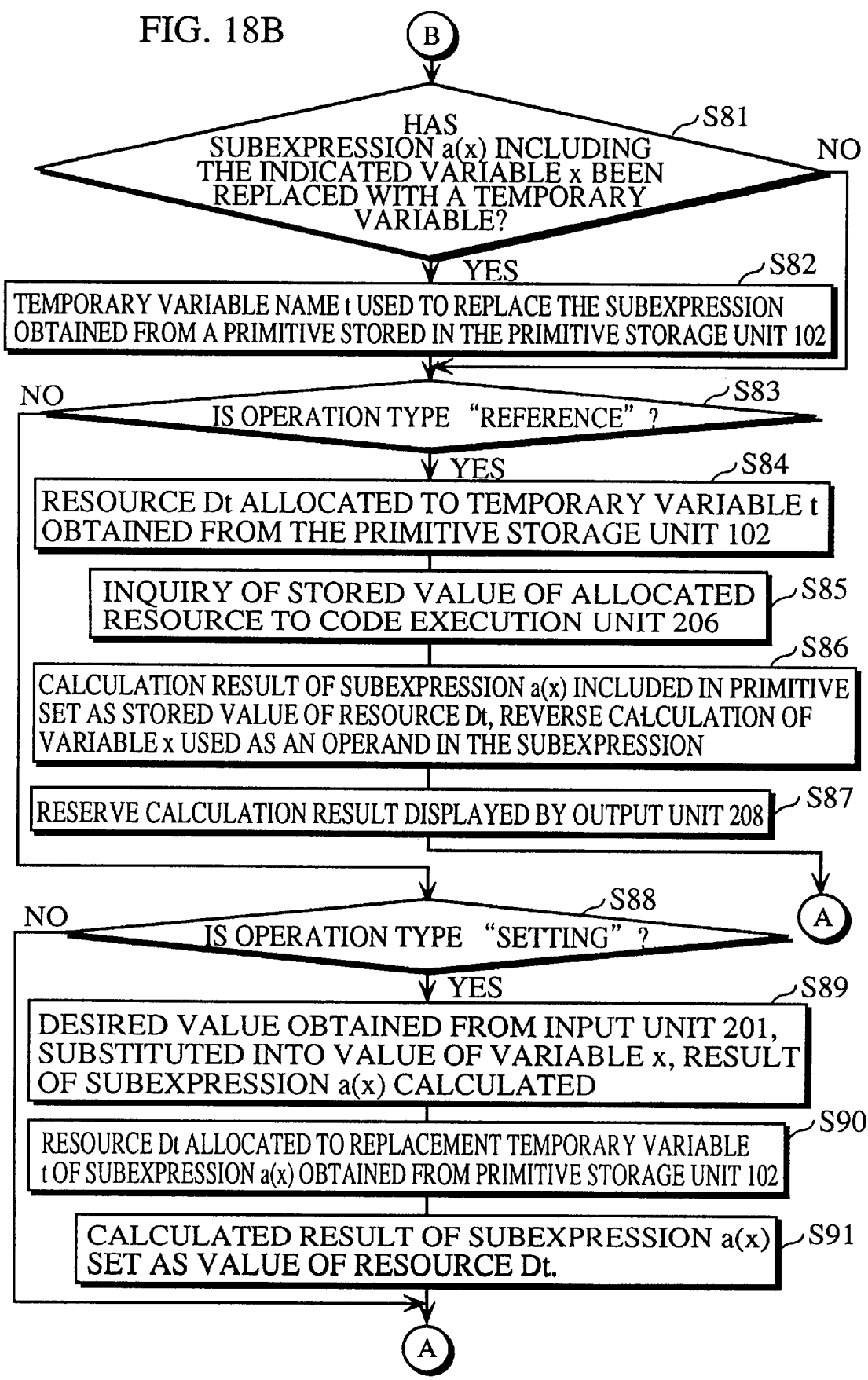
FIG. 18B is also a flowchart for the processing content of the variable operation unit 207 in the second embodiment.

In this second embodiment, the variable operation unit 207 performs operations of variables in accordance with the flowchart shown in FIGS. 18A and 18B. The following is an explanation of the operation of the variable operation unit 207 in the second embodiment with reference to the flowchart in FIG. 18A. In step S71 of the flowchart of FIG. 18A, the variable operation unit 207 waits for an indication of a variable name and operation type from the input unit 201.

Here, suppose that the user indicates a reference of the value of variable x on Line 7 using the command line of the input unit 201. When the input unit 201 receives such an indication, in step S72 the variable operation unit 207 refers to the primitives stored in the primitive storage unit 102 to see what has been used to replace the variable indicated by the user via the input unit input unit 201. In step S73, the variable operation unit 207 judges whether the indicated variable has been replaced with a temporary variable, and, when this is not the case, the processing advances to step S81 where it is judged whether a subexpression "a (x)" including the indicated variable x has been replaced with a temporary variable. In the present example, the variable x in Line 7 which is indicated by the user via the input unit input unit 201 is present in the subexpression "x+3" which has been replaced with the temporary variable t2, so that the judgment "No" is given in step S73, the judgment "Yes" is given in step S81, and the processing advances to step S82. In step S82, the variable operation unit 207 obtains the temporary variable which is used to replace the subexpression from the primitives stored by the primitive storage unit 102. In the present example, the temporary variable t2 is used to replace the subexpression "x+3" on Line 7, so that this temporary variable t2 is obtained in step S82.

Next, in step S83 the variable operation unit 207 judges whether the type of operation indicated by the user via the input unit 201 is a reference If so, the resource which is allocated to the obtained temporary variable is obtained in step S64 from the primitive storage unit 102.

Figure 19A:
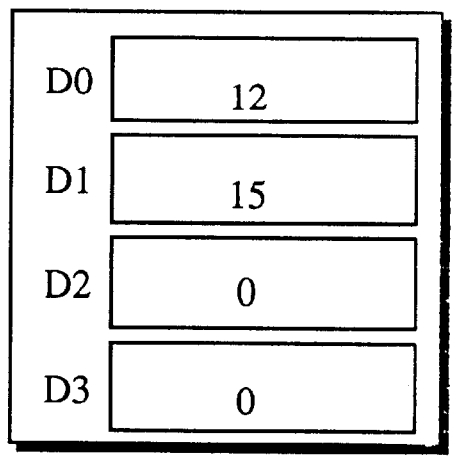
FIG. 19A shows an example of the stored content of each register when the execution code of the generated code storage unit 103 has been executed in the stated hardware environment by the code execution unit 206.

By referring to the primitive for line 7 shown in FIG. 17B, it can be seen that data register D1 has been allocated to the temporary variable t2. Once it is established that the allocated resource is data register D1, the variable operation unit 207 makes an inquiry to the code execution unit 206 for the stored value of the allocated resource. When the value of each register in the hardware environment used by the code execution unit 206 is as shown in FIG. 19A, it can be seen that the stored value of data register D1 is "15". On obtaining the value of the debugging apparatus in this way, in step S86 the calculation result of the subexpression "a(x)" included in the primitives is set as the stored value of the resource and the value of the variable x which is used as an operand in the subexpression is inversely calculated. In the present example, the value of the temporary variable t2 is "15" and the subexpression before replacement is "x+3". Here, the relationship "x+3=t2" is established in the primitives stored in the primitive storage unit 102, so that the value of variable x is inversely calculated as "12".

Figure 19B:
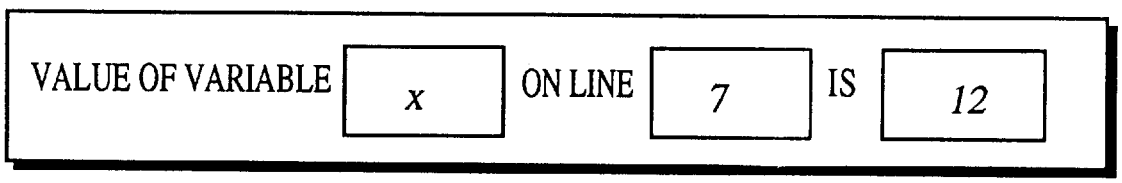
FIG. 19B shows an example display by the output unit 208, when processing has been performed by the variable operation unit 207 according to the flowchart in FIG. 18.

On obtaining the inversely calculated result, the variable operation unit 207 has the output unit 208 display the value of the variable x, as shown in FIG. 19B.

Figure 19C:
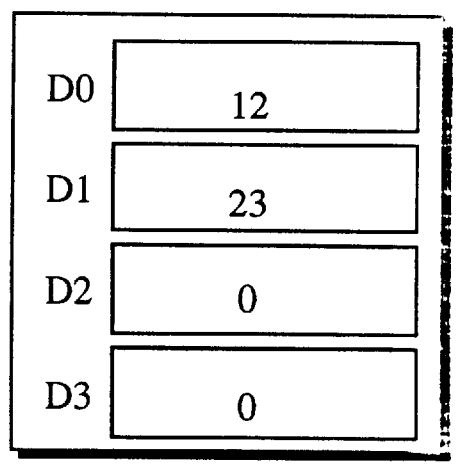
FIG. 19C shows an example or the stored content of each register when the execution code of the generated code storage unit 103 has been executed in the stated hardware configuration by the code execution unit 206.

On seeing this value, the user gives an indication for a setting operation setting the value of variable x at "20". In the same way as before, the judgment "No" is given in step S73, the judgment "Yes" is given in step S81, and the processing advances to step S83 via step S82, where the operation type is a setting operation, resulting in the judgment "No", so that the processing advances to step S88. In step S88, the variable operation unit 207 receives the desired value "20" from the input unit 201, and substitutes this as the value of variable x into the subexpression "a(x)" which it then calculates. Since the relationship "t2=x+3" is established, the calculation result of the subexpression a(x) is "23", so that the value of the temporary variable t2 becomes "23". Once the value of this temporary variable has been calculated, in step S90 the resource, data register D1, allocated to the temporary variable used to replace the subexpression a(X) is obtained from the primitive storage unit 102, and the calculation result of the subexpression "a(x)" is set in the data register D1. By doing so, the value of the data register D1 is reset at "23", as shown in FIG. 19C.

The above explanation deals with the processing for the case when a subexpression is replaced with a temporary variable, so that the following explanation will deal with the case when a variable is replaced with a temporary variable. In such case, the judgment "Yes" is given in step S73 and the variable operation unit 207 obtains the temporary variable name from the primitives stored in the primitive storage unit 102. Following this, the resource allocated to the temporary variable is obtained from the primitive storage unit 102 in step S74.

Here, if the operation type is reference, the variable operation unit 207 makes an inquiry about the stored value of the resource in question to the code execution unit 206, before the output unit 208 displays the stored value of this resource. If, on the other hand, the operation type is "setting", the variable operation unit 207 receives the desired value from the input unit 201 and has the code execution unit 206 set this value as the stored value of the resource in question.

By means of the present embodiment described above, the user is able to perform the reference and the setting of variables which are present in the program he/she has written, even when the expressions which include the variables have been replaced with temporary variables in the optimization performed by the program conversion apparatus.

It should be noted here that the present embodiment describes the case when a reference is performed for a variable included in a subexpression in the program which is replaced using a temporary variable, although it is also possible for the variable operation unit 207 to calculate the value of a temporary variable for a value inputted via the variable operation unit 207 and to have this value set by the variable operation unit, thereby enabling the user to set the value of a variable in the program.

In the present embodiment, in the debugging apparatus, the subexpression showing the relation between the variable in the program and a temporary variable, and the information showing what resource has been allocated to this temporary resource are obtained from the primitive storage unit 102, with the name of the temporary variable included in an expression being found using the variables in the program and the resource name then being found from the temporary variable name. However, it is also possible for the program conversion apparatus to first search the primitive storage unit 102 and to obtain the relationship between the program variable and resource namer and store an expression which shows the relationship between a variable and a resource in the primitive storage unit 102. By doing so, it is possible to know which resource is assigned to a variable by merely referring to the expressions stored in the primitive storage unit 102.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A program development system made up of a debugging information generation apparatus, which monitors a compiling of a source file made up of a plurality of source code statements and which generates information for debugging, and a debugging apparatus for performing operation verification of a machine language program obtained from the compiling, said debugging information generation apparatus comprising:

first judging means for judging, for each line of the source file, whether any predetermined editing functions have been applied to any set of code in the source file during optimization of internal expressions which are generated from the source rile during the compiling; and generating means for generating, when any of the predetermined editing functions is judged to have been applied to a set of code, transformation information which expresses a transformation due to the applied editing function as combination of a line number of a line which includes a source code statement corresponding to said set of code, the applied editing functions and the set of code before and after the editing function has been applied, and said debugging apparatus comprising:

command receiving means for receiving a debugging command which is a command to verify operation of the machine language program created by the compiling;

analyzing means for interpreting a content of the debugging command, and, when the debugging command includes an indication for a set of code before an application of an editing function, for analyzing details of a transformation of said set of code due to the application of the editing function, based all of the transformation information which includes said set of code;

first display means for displaying said details of said transformation analyzed by said analyzing means; and operation verification means for referring to the details of said transformation analyzed by said analyzing means and detecting sets of execution code, out of all sets of execution code in said machine language program, which relate to said debugging command and performing operation verification for said detected sets of execution code.

2. The program development system of claim 1, wherein the first judging means includes:

a first judging unit for judging whether a first editing function, in which a variable in a source code statement is replaced with one of another variable and a constant, has been performed during optimization;

a second judging unit for judging whether a second editing function, in which a subexpression in a source code statement is replaced with one of another variable and a constant, has been performed during optimization;

a third judging unit for judging whether a third editing function, in which a source code statement is moved to another line, has been performed during optimization; and a fourth judging unit for judging whether a fourth editing function, in which a source code statement is deleted, has been performed during optimization, and wherein said generating means includes:

a first generating unit for generating, when it is judged that said first editing function has been performed, a set of type 1 transformation information which includes a line number of a line where the corresponding source code statement is present, a replaced variable name for the variable which is replaced one of a substitute constant and a substitute variable after replacement, and identification information which shows replacement is performed;

a second generating unit for generating, when it is judged that said second editing function has been performed, a set of type 2 transformation information which includes a line number of a line where the corresponding source code statement is present, a replaced subexpression which is replaced, one of a substitute constant and a substitute variable after replacement, and identification information which shows replacement is performed;

a third generating unit for generating, when it is judged that said third editing function has been performed, a set of type 3 transformation information which includes an original line number which is a line number of a line where the source code statement was originally present, a destination line number which is a line number of a line to which the source code statement has been moved, and identification information showing that movement is performed; and a fourth generating unit for generating, when it is judged that said fourth editing function has been performed, a set of type 4 transformation information which includes a line number of a line where the source code statement was originally present, and identification information showing that deletion is performed.

3. The program development system of claim 2, wherein the debugging information generation apparatus further comprises:

first detecting means for detecting, when said third generating unit has generated a set of type 3 transformation information, any out of a set of type 1 transformation information generated by said first generating unit and a set of type 2 transformation information generated thus far by said second generating unit which includes a same line number as the original line number of the source code statement included in said set of type 3 transformation information; and first deleting means for deleting the transformation information detected by the first detecting means.

4. The program development system of claim 3, wherein the debugging information generation apparatus further comprises:

second detecting means for detecting, when a set of type 4 transformation information is generated by the fourth generating unit, one of a set of type 1 transformation information and a set or type 2 transformation information which includes a same line number as the original line number of the source code statement which is included in the detected set of type 4 transformation information; and second deleting means for deleting the transformation information detected by the second detecting means.

5. The program development system of claim 2, wherein the debugging apparatus further comprises:

transformation information storage means for storing sets of type 1 to type 4 transformation information generated by said first to fourth generating units; and allocation information storage means for storing sets of allocation information each made up of pairings of a line number of a line where a source code statement is present and a variable name-resource name relation, which express which hardware resource has been allocated to which variable in which source code statement, wherein the analyzing means includes:

a first interpreting unit for interpreting an indication of a variable name included in the debugging command whose stored value is to be read;

a first detecting unit for detecting the variable interpreted by the first interpreting unit, when said variable is indicated as one of a replaced variable and a substitute variable by one of a set of type 1 transformation information and a set of type 2 transformation information stored by the transformation information storage means; a second detecting unit for detecting any set of allocation information stored in the allocation information storage unit which includes a substitute variable included in the set of transformation information detected by the first detecting unit;

a combining unit for combining a new set of allocation information made up of a replaced variable and a substitute variable in the set of transformation information detected by the first detecting unit and a resource name in the set of allocation information detected by the second detecting unit; and a reading unit for reading, when included in a read instruction, a value of a hardware resource which is indicated by the resource name included in the new set of allocation information, and wherein said first display means includes a first display unit for displaying, when a read operation of a hardware resource has been performed, a message showing that the replaced variable has been replaced with the substitute variable, and that both the replaced variable and the substitute variable have the value read from the hardware resource.

6. The program development system of claim 5, wherein the debugging apparatus further comprises;

a second interpreting unit for interpreting a variable name of a variable into which a desired value is to be written, said variable name being included in the debugging command, wherein the first detecting unit detects whether the variable name indicated by the user is indicated by any of a set of type 1 transformation information and a set of type 2 transformation information as one of a replaced variable and a substitute variable, wherein the second detecting means detects whether any set of allocation information includes a substitute variable included in the set of transformation information detected by the first detecting unit, wherein the combining unit combines the resource name, the replaced variable name, and the replaced variable name included in the set of transformation information detected by the first detecting unit and in the set of allocation information detected by the second detecting unit into a new set of allocation information; and a writing unit for writing, when the user gives a write indication, the desired value into the hardware resource whose hardware resource name is included in the new set of allocation information, and wherein the first display means includes a second display unit for displaying, when a write operation is performed for a hardware resource, a message which shows that the replaced variable has been replaced with the substitute variable and a message which shows that both the replaced variable and the substitute variable have been set at the desired value.

7. The program development system of claim 6, wherein the debugging apparatus further comprises:

line-address information storage means for storing sets of line-address information for expressing how a source code statement on each line has been converted into execution code, wherein each set of line-address information is made up of a line number of a line where a source code statement is located and an address of execution code which corresponds to the source code statement; and a third interpreting unit for interpreting a line number of a source code statement which includes a variable which is to be read, wherein the operation verification means includes:

a first fetching unit for fetching an address of execution code which corresponds to the line number interpreted by the third interpreting unit;

a second fetching unit for fetching a resource name of a resource indicated by a new set of allocation information which has been combined by the combining unit and which includes the line number corresponding to the fetched address:

a first address determining unit for determining the fetched address as a breakpoint setting address; and an executing unit for executing the machine language program as far as the determined breakpoint setting address, wherein the reading unit and writing unit respectively perform a reading and a writing of a hardware resource indicated by the fetched resource name after the machine language program has been executed by the executing unit.

8. The program development system of claim 7, wherein the debugging apparatus further comprises:

a fifth judging unit for referring, when one of an indication of a variable whose value is to be read and an indication of a variable into which a desired value is to be written has been interpreted by one of the first interpreting unit and the second interpreting unit, to the sets of type 3 transformation information and judging whether a source code statement which includes said variable has been moved; and a sixth judging unit for referring, when one of an indication of a variable whose value is to be read and an indication of a variable into which a desired value is to be written has been interpreted by one of the first interpreting unit and the second interpreting unit, to the sets of type 4 transformation information and judging whether a source code statement which includes said variable has been deleted, and wherein the first display means includes;

a first warning unit for warning a user, when the fifth judging unit judges that the source code statement has been moved, that the indicated reading and writing cannot be performed because the source code statement has been moved from an original line;

a second warning unit for warning a user, when the sixth judging unit judges that the source code statement has been deleted, that the indicated reading and writing cannot be performed because the source code statement has been deleted from an original line; and a third warning unit for warning a user, when the source code statement has been neither moved nor deleted, but there is no set of allocation information including a variable name of the substitute variable included in the set of transformation information detected by the second detecting means, that reading and writing of the indicated variable cannot be performed.

9. The program development system of claim 8, wherein the analyzing means further includes:

a fourth interpreting unit for interpreting an indication for an execution of the machine language program included in a debugging command and an indication of a line where a breakpoint is to be set; and a seventh judging unit for referring to sets of type 3 and type 4 transformation information and judging whether a source code statement on an indicated line has been moved to another line or whether the source code statement is still located at an original line, wherein the first display means includes a notifying unit for notifying the user, when the seventh judging unit judges that the source code statement has been moved, of the movement destination line number and a message indicating that a breakpoint has been set at the original line number, wherein the operation verification means includes:

said first address determining unit for determining, when a source code statement is judged to be at the original line number or is judged to have been deleted, said breaking point setting address based on a correspondence relation between the source code statement and the execution code stored in the line-address information storage means; and a second address determining unit for determining, when a source code statement is judged to have been moved, a breakpoint setting address based on a correspondence relation between the source code statement and the execution code stored in the line-address information storage means, and wherein the executing unit executes the machine language program as far as the determined breakpoint setting address.

10. The program development system of claim 5, wherein the debugging apparatus further includes:

a function indication receiving means for receiving an indication from a user for a function in a source file whose operation is to be verified;

a second display means for extracting some of the source code statements included in the indicated function and displaying the extracted source code statements in a predetermined first window; and a third display means for displaying execution code which corresponds to the source code statements displayed in the predetermined first window, out of all execution code included in the machine language program, in a second window arranged in a predetermined direction with respect to the displayed source code statements, wherein the debugging information generation apparatus further includes:

first embellishing means for embellishing, when the debugging command receiving means receives a debugging command which indicates a line to have a breakpoint setting, a display of a source code statement at a corresponding line which is displayed in the first window displayed by the second display means;

second judging means for judging, when a source code statement is embellished by the first embellishing means, an address of execution code which corresponds to the embellished source code statement; and second embellishing means for embellishing a display of execution code at the address judged by the second judging means in the second window displayed by the third display means.

11. The program development system of claim 10, wherein the debugging apparatus further comprises;

third detecting means for detecting, when a user indication of a function whose operation is to be verified has been received by the function indication receiving means, any source code statements included in the indicated function which are indicated in a set of type 3 transformation information as a moved source code statement;

fourth detecting means for detecting, when a user indication of a function whose operation is to be verified has been received by the function indication receiving means, any source code statements included in the indicated function which are indicated in a set of type 4 transformation information as a deleted source code statement;

first label attaching means for displaying each line which has a source code statement detected by the third detecting means with a label which shows that the source code statement of the line has been moved; and second label attaching means for displaying each line which has a source code statement detected by the fourth detecting means with a label which shows that the source code statement of the line has been deleted.

12. The program development system of claim 11, wherein the debugging apparatus further comprises:

fifth detecting means for detecting all of the variables included in the function indicated by the function indicating means;

sixth detecting means detecting a set of type 1 transformation information and a set of allocation information which include a variable detected by the fifth detecting means; and arranging means for displaying a hardware resource name included in a set of allocation information, a replaced variable and a substitute variable detected by the sixth detecting means, and a message showing that replacement has been performed, arranged in a predetermined direction with respect to a source code statement which includes said variables.

13. The program development system of claim 12, wherein the debugging apparatus further comprises;

third judging means for referring to sets of allocation information which include each variable in said source code statements and judging whether reading and writing are possible for each resource which corresponds to each of said variables; and mark positioning means for positioning marks on a display to show that reading and writing are possible for each source code statement which includes a variable for which reading and writing are judged possible.

14. The program development system of claim 5, wherein the debugging apparatus further comprises:

a counting unit for counting a total amount of information stored in the transformation information storage means and in the assignment information storage means; and control means for controlling, when the total amount of information is equal to or below a predetermined threshold, the combining means to combine a set of type 1 transformation information and a set of allocation information into a new set of allocation information which is made up of a resource name included in said set of allocation information, and the replaced variable and the substitute variable included in said set of type 1 transformation information.

15. The program development system of claim 5, wherein the debugging apparatus further comprises:

a counting unit for counting a total number of lines of source code statements stored in the transformation information storage means and in the assignment information storage means; and control means for controlling, when the total number of lines is equal to or below a predetermined threshold, the combining means to combine a set or type 1 transformation information and a set of allocation information into a new set of allocation information which is made up of a resource name included in said set of allocation information, and the replaced variable and the substitute variable included in said set of type 1 transformation information.

16. The program development system of claim 5, wherein the debugging apparatus further comprises:

a counting unit for counting a code size of the execution code; and control means for controlling, when the counted code size is equal to or below a predetermined threshold, the combining means to combine a set or type 1 transformation information and a set of allocation information into a new set of allocation information which is made up of a resource name included in said set of allocation information, and the replaced variable and the substitute variable included in said set of type 1 transformation information.

17. A debugging information generation apparatus which monitors the compiling of a source file made up of a plurality of source code statements and which generates information for debugging, said debugging information generation apparatus comprising:

first judging means for judging, for each line of the source file, whether any predetermined editing functions have been applied to any set of code in the source file during optimization of internal expressions which are generated from the source file during the compiling; and generating means for generating, when any of the predetermined editing functions is judged to have been applied to a set of code, transformation information which expresses a transformation due to the applied editing function as combination of a line number of a line which includes a source code statement corresponding to said set of code, the applied editing function, and the set of code before and after the editing function has been applied, wherein the first judging means includes:

a first judging unit for judging whether a first editing function, In which a variable in a source code statement is replaced with one of another variable and a constant, has been performed during optimization;

a second judging unit for judging whether a second editing function, in which a subexpression in a source code statement is replaced with one of another variable and a constant, has been performed during optimization;

a third judging unit for judging whether a third editing function, in which a source code statement is moved to another line, has been performed during optimization: and a fourth judging unit for judging whether a fourth editing function, in which a source code statement is deleted, has been performed during optimization, and wherein said generating means includes:

a first generating unit for generating, when it is judged that said first editing function has been performed, a set of type 1 transformation information which includes a line number of a line where the corresponding source code statement is present, a replaced variable name for the variable which is replaced, one of a substitute constant and a substitute variable after replacement, and identification information which shows replacement is performed;

a second generating unit for generating, when it is judged that said second editing function has been performed, a set of type 2 transformation information which includes a line number of a line where the corresponding source code statement is present, a replaced subexpression which is replaced, one of a substitute constant and a substitute variable after replacement, and identification information which shows replacement is performed;

a third generating unit for generating, when it is judged that said third editing function has been performed, a set of type 3 transformation information which includes an original line number which is a line number of a line where the source code statement was originally present, a destination line number which is a line number of a line to which the source code statement has been moved, and identification information showing that movement is performed; and a fourth generating unit for generating, when it is judged that said fourth editing function has been performed, a set of type 4 transformation information which includes a line number of a line where the source code statement was originally present, and identification information showing that deletion is performed.

18. The debugging information generation apparatus of claim 17, further comprising:

first detecting moans for detecting, when said third generating unit has generated a set of type 3 transformation information, any out of a set of type 1 transformation information generated by said first generating unit and a set of type 2 transformation information generated thus far by said second generating unit which includes a same line number as the original line number of the source code statement included in said set of type 3 transformation information; and first deleting means for deleting the transformation information detected by the first detecting means.

19. The debugging information generation apparatus of claim 18, further comprising:

second detecting means for detecting, when a set of type 4 transformation information is generated by the fourth generating unit, one of a set of typo 1 transformation information and a set of type 2 transformation information which includes a same line number as the original line number of the source code statement which is included in the detected set of type 4 transformation information; and second deleting means for deleting the transformation information detected by the second detecting means.

20. A debugging apparatus for performing operation verification of a machine language program obtained from compiling a source file made up of a plurality of source code statements, wherein said source file is subjected to predetermined editing functions after first being converted to internal expressions during compiling, said debugging apparatus comprising:

storage means for storing sets of transformation information which each show a transformation caused by one of said editing functions, each of said sets of transformation information being made up of a line number of a line which includes a source code statement corresponding to code subjected to an editing functions a editing function content, and a pairing of codes before and after the editing function is executed;

command receiving means for receiving a debugging command which is a command to verify operation of the machine language program created by the compiling;

analyzing means for interpreting a content of the debugging command, and, when the debugging command includes an indication for a set of code before an application of an editing function, for analyzing details of a transformation of said set of code due to the application of the editing function, based all of the transformation information which includes said set of code;

first display means for displaying said details of said transformation analyzed by said analyzing means; and operation verification means for referring to the details of said transformation analyzed by said analyzing means and detecting sets or execution code, out of all sets of execution code in said machine language programs which relate to said debugging command and performing operation verification for said detected sets of execution code.

21. The debugging apparatus of claim 20, further comprising:

transformation information storage means for storing sets of type 1 to type 4 transformation information generated by said first to fourth generating units; and allocation information storage means for storing sets of allocation information, each made up of pairings of a line number of a line where a source code statement is present and a variable name-resource name relation, which express which hardware resource has been allocated to which variable in which source code statement, wherein the analyzing means includes:

a first interpreting unit for interpreting an indication of a variable name included in the debugging command whose stored value is to be read;

a first detecting unit for detecting the variable interpreted by the first interpreting unit, when said variable is indicated as one of a replaced variable and a substitute variable by one of a set of type 1 transformation information and a set of type 2 transformation information stored by the transformation information storage means;

a second detecting unit for detecting any set of allocation information stored in the allocation information storage unit which includes a substitute variable included in the set of transformation information detected by the first detecting unit;

a combining unit for combining anew set of allocation information made up of a replaced variable and a substitute variable in the set of transformation information detected by the first detecting unit and a resource name in the set of allocation information detected by the second detecting unit; and a reading unit for reading, when included in a read instruction, a value of a hardware resource which is indicated by the resource name included in the new set of allocation information, and wherein said first display means includes a first display unit for displaying, when a read operation of a hardware resource has been performed, a message showing that the replaced variable has been replaced with the substitute variable, and that both the replaced variable and the substitute variable have the value read from the hardware resource.

22. The debugging apparatus of claim 21, further comprising:

a second interpreting unit for interpreting a variable name of a variable into which a desired value is to be written, said variable name being included in the debugging command, wherein the first detecting unit detects whether the variable name indicated by the user is indicated by any of a set of type 1 transformation information and a set of type 2 transformation information as one of a replaced variable and a substitute variable, wherein the second detecting means detects whether any set of allocation information includes a substitute variable included in the set of transformation information detected by the first detecting unit, wherein the combining unit combines the resource name, the replaced variable name, and the replaced variable name included in the set or transformation information detected by the first detecting unit and in the set of allocation information detected by the second detecting unit into a new set of allocation information; and a writing unit for writing, when the user gives a write indication, the desired value into the hardware resource whose hardware resource name is included in the new set of allocation information, and wherein the first display means includes a second display unit for displaying, when a write operation is performed for a hardware resource, a message which shows that the replaced variable has been replaced with the substitute variable and a message which shows that both the replaced variable and the substitute variable have been set at the desired value.

23. The debugging apparatus of claim 22, further comprising;

line-address information storage means for storing sets of line-address information for expressing how a source code statement on each line has been converted into execution code, wherein each set of line-address information is made up of a line number of a line where a source code statement is located and an address of execution code which corresponds to the source code statement; and a third interpreting unit for interpreting a line number of a source code statement which includes a variable which is to be read, wherein the operation verification means includes:

a first fetching unit for fetching an address of execution code which corresponds to the line number interpreted by the third interpreting unit;

a second fetching unit for fetching a resource name of a resource indicated by a new set of allocation information which has been combined by the combining unit and which includes the line number corresponding to the fetched address;

a first address determining unit for determining the fetched address as a breakpoint setting address; and an executing unit for executing the machine language program as far as the determined breakpoint setting address, wherein the reading unit and writing unit respectively perform a reading and a writing of a hardware resource indicated by the retched resource name after the machine language program has been executed by the executing unit.

24. The debugging apparatus of claim 23, further comprising:

a fifth judging unit for referring, when one of an indication of a variable whose value is to be read and an indication of a variable into which a desired value is to be written has been interpreted by one of the first interpreting unit and the second interpreting unit, to the sets of type 3 transformation information and judging whether a source code statement which includes said variable has been moved; and a sixth judging unit for referring, when one of an indication of a variable whose value is to be read and an indication of a variable into which a desired value is to be written has been interpreted by one or the first interpreting unit and the second interpreting unit, to the sets of type 4 transformation information and judging whether a source code statement which includes said variable has been deleted, and wherein the first display means includes:

a first warning unit for warning a user, when the fifth judging unit judges that the source code statement has been moved, that the indicated reading and writing cannot be performed because the source code statement has been moved from an original line;

a second warning unit for warning a user, when the sixth judging unit judges that the source code statement has been deleted, that the indicated reading and writing cannot be performed because the source code statement has been deleted from an original line; and a third warning unit for warning a user, when the source code statement has been neither moved nor deleted, but there is no set of allocation information including a variable name of the substitute variable included in the set of transformation information detected by the second detecting means, that reading and writing of the indicated variable cannot be performed.

* * * * *